United States Patent
Gupta et al.

(10) Patent No.: US 12,443,453 B2
(45) Date of Patent: Oct. 14, 2025

(54) AUTONOMOUS AND EXTENSIBLE RESOURCE CONTROL BASED ON SOFTWARE PRIORITY HINT

(71) Applicant: Intel Corporation, Santa Clara, CA (US)

(72) Inventors: Monica Gupta, Hillsboro, OR (US); Russell Fenger, Beaverton, OR (US); Andrew J. Herdrich, Hillsboro, OR (US); Rajshree Chabukswar, Sunnyvale, CA (US); Jumnit Hong, Portland, OR (US); Sneha Gohad, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 876 days.

(21) Appl. No.: 17/134,252

(22) Filed: Dec. 25, 2020

(65) Prior Publication Data

US 2022/0206862 A1 Jun. 30, 2022

(51) Int. Cl.
*G06F 9/50* (2006.01)
*G06F 9/38* (2018.01)

(52) U.S. Cl.
CPC .......... *G06F 9/5038* (2013.01); *G06F 9/3851* (2013.01); *G06F 9/5016* (2013.01); *G06F 2209/5021* (2013.01)

(58) Field of Classification Search
CPC .............................................. G06F 2209/5021
See application file for complete search history.

(56) References Cited

U.S. PATENT DOCUMENTS

| | | | | |
|---|---|---|---|---|
| 2001/0056456 | A1* | 12/2001 | Cota-Robles | G06F 9/4843 718/103 |
| 2006/0179196 | A1* | 8/2006 | Gray | G06F 13/14 710/240 |
| 2008/0075101 | A1* | 3/2008 | Illikkal | G06F 9/5038 370/412 |
| 2009/0138683 | A1* | 5/2009 | Capps, Jr. | G06F 9/3851 712/E9.001 |

(Continued)

FOREIGN PATENT DOCUMENTS

EP 1213650 A2 6/2002

OTHER PUBLICATIONS

Cache QoS: From Concept to Reality in the Intel® Xeon® Processor E5-2600 v3 Product Family Andrew Herdrich, Edwin Verplanke, Priya Autee, Ramesh Illikkal, Chris Gianos, Ronak Singhal, Ravi Iyer (Year: 2016).*

(Continued)

*Primary Examiner* — April Y Blair
*Assistant Examiner* — Paul V Mills
(74) *Attorney, Agent, or Firm* — Nicholson De Vos Webster & Elliott LLP

(57) ABSTRACT

Embodiments of apparatuses, methods, and systems for resource control based on software priority are described. In embodiments, an apparatus includes resource sharing hardware and multiple cores. The resource sharing hardware is to share the shared resource among the cores. A first core includes first execution circuitry to execute multiple threads. The first core also includes registers programmable by software. A first register is to store a first identifier of a first thread and a first priority tag to indicate a first priority of the first thread relative to a second priority of a second thread. A second register to store a second identifier of the second thread and a second priority tag to indicate the second priority of the second thread relative to the first priority of the first thread. The resource sharing hardware is to use the first priority and the second priority to control access to the shared resource by the first thread and the second thread.

12 Claims, 22 Drawing Sheets

(56) References Cited

U.S. PATENT DOCUMENTS

| | | | | |
|---|---|---|---|---|
| 2009/0172315 A1* | 7/2009 | Iyer | ............... | G06F 12/126 |
| | | | | 711/158 |
| 2012/0300630 A1* | 11/2012 | Abel | ............... | H04L 69/22 |
| | | | | 370/235 |
| 2015/0347189 A1* | 12/2015 | Steffen | ............ | G06F 9/4893 |
| | | | | 718/103 |
| 2016/0284021 A1* | 9/2016 | Herdrich | ......... | G06F 12/0897 |
| 2017/0285710 A1* | 10/2017 | Ardanaz | .......... | G06F 1/28 |
| 2019/0102229 A1* | 4/2019 | Gupta | ............ | G06F 9/5027 |

OTHER PUBLICATIONS

PMU-guided Priority Adjustment to Guarantee Thread Performance on IBM Power SMT Processor Zhengyu He and Bo Hong (Year: 2012).*

QoS Policies and Architecture for Cache/Memory in CMP Platforms Ravi Iyer, Li Zhao, Fei Guo, Ramesh Illikkal, Srihari Makineni, Don Newell, Yan Solihin, Lisa Hsu, Steve Reinhardt (Year: 2007).*

Rate-Based QoS Techniques for Cache/Memory in CMP Platforms Andrew Herdrich, Ramesh Illikkal, Ravi Iyer, Don Newell, Vineet Chadha, Jaideep Moses (Year: 2009).*

Supporting Differentiated Services in Computers via Programmable Architecture for Resourcing-on-Demand (PARD) Jiuyue Ma, Xiufeng Sui, Ninghui Sun, Yupeng Li, Zihao Yu, Bowen Huang, Tianni Xu, Zhicheng Yao, Yun Chen, Haibin Wang, Lixin Zhang, Yungang Bao (Year: 2015).*

Johnson et al., "A Comparison of Fast and Low Overhead Distributed Priority Locks", Journal of Parallel and Distributed Computing, vol. 32, No. 1, Jan. 10, 1996, pp. 74-89.

Partial European Search Report and Search Opinion, EP App. No. 21197066.0, Jun. 22, 2022, 11 pages.

Office Action, EP App. No. 21197066.0, Jan. 3, 2024, 06 pages.

* cited by examiner

| 63-12 | ... | 23-16 | 15-8 | 7-0 |
|---|---|---|---|---|
| Reserved | | PTAG 2 Priority | PTAG 1 Priority | PTAG 0 Priority |

FIG. 1D

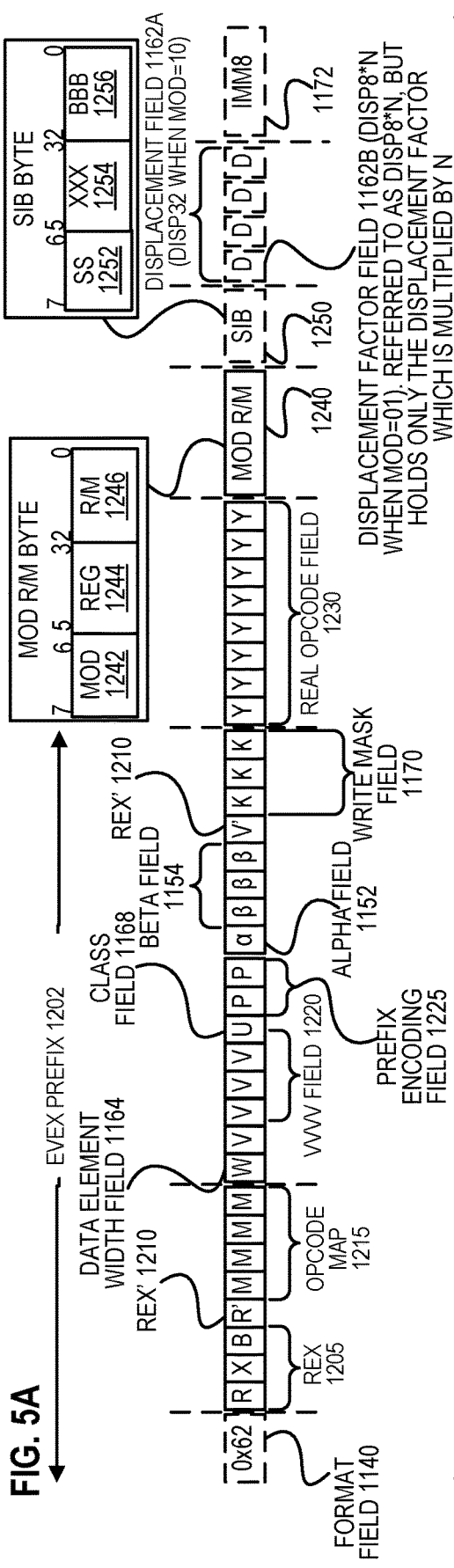
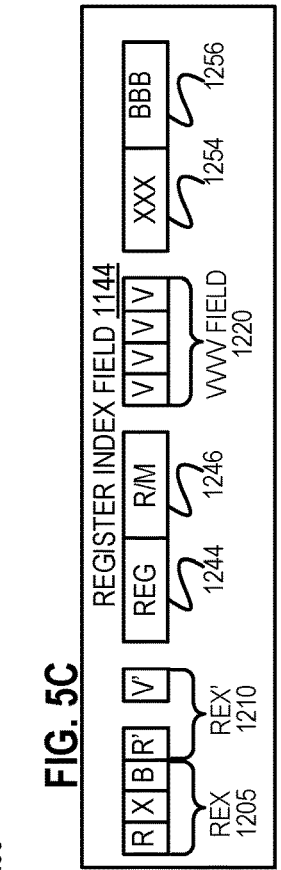
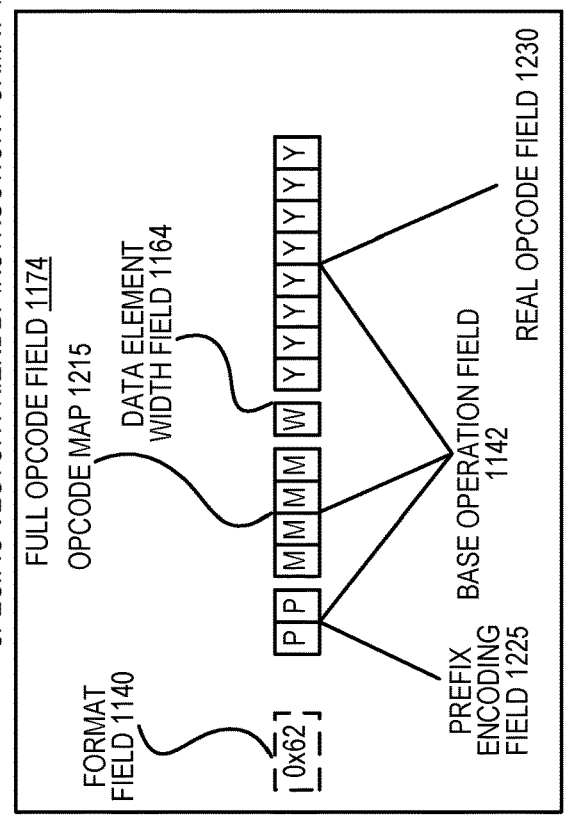
FIG. 5A
FIG. 5B
FIG. 5C

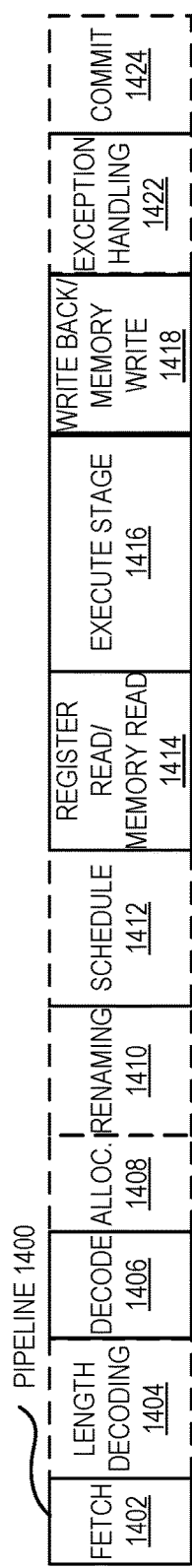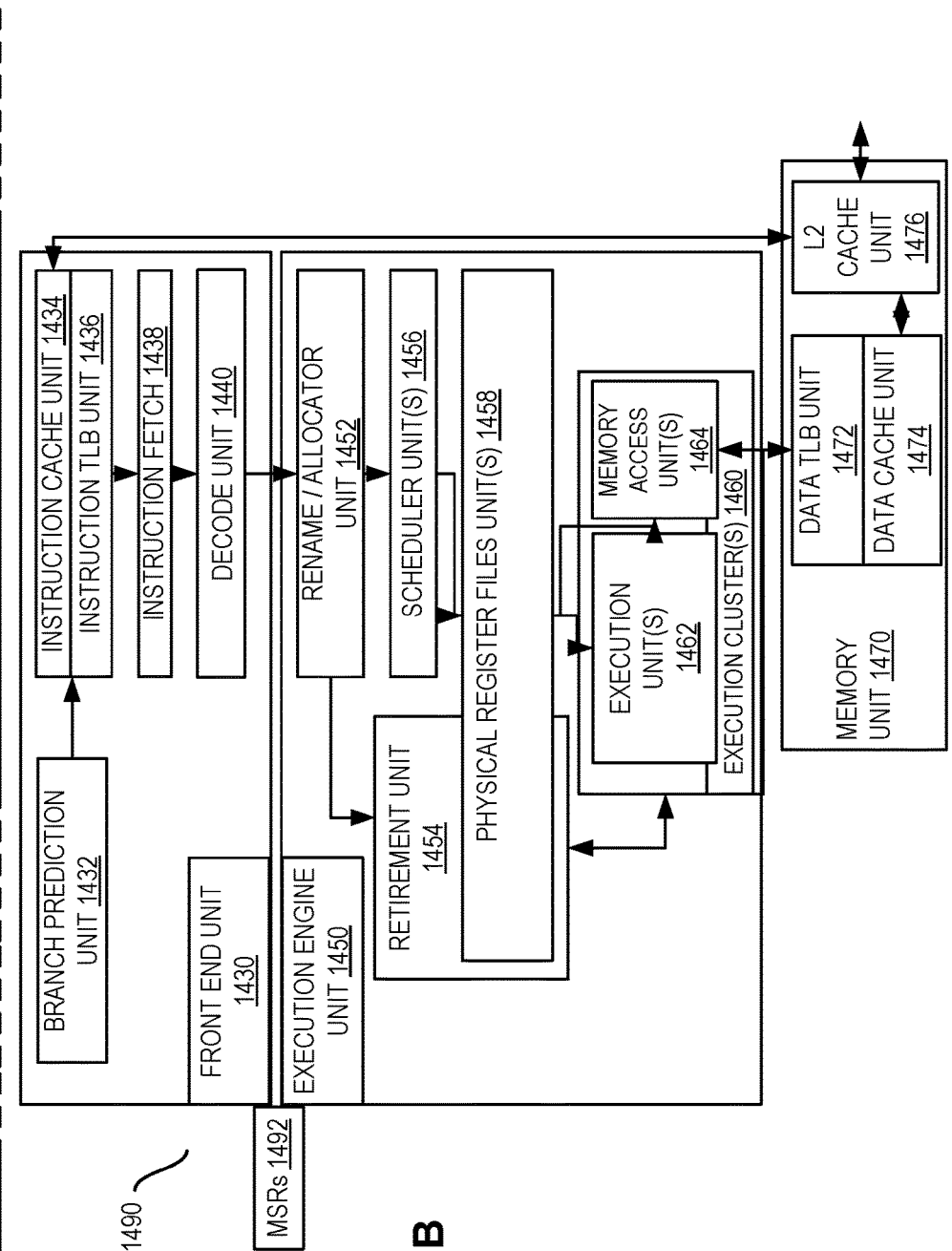
FIG. 7A
FIG. 7B

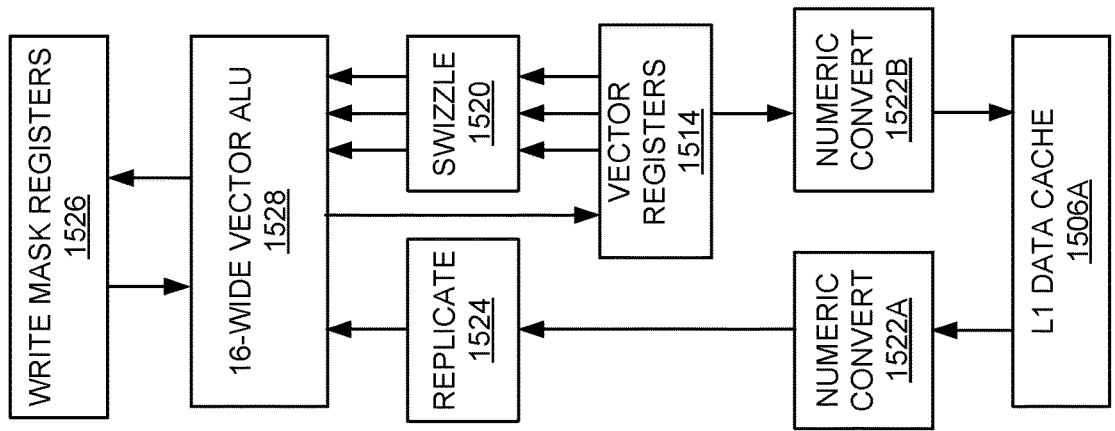
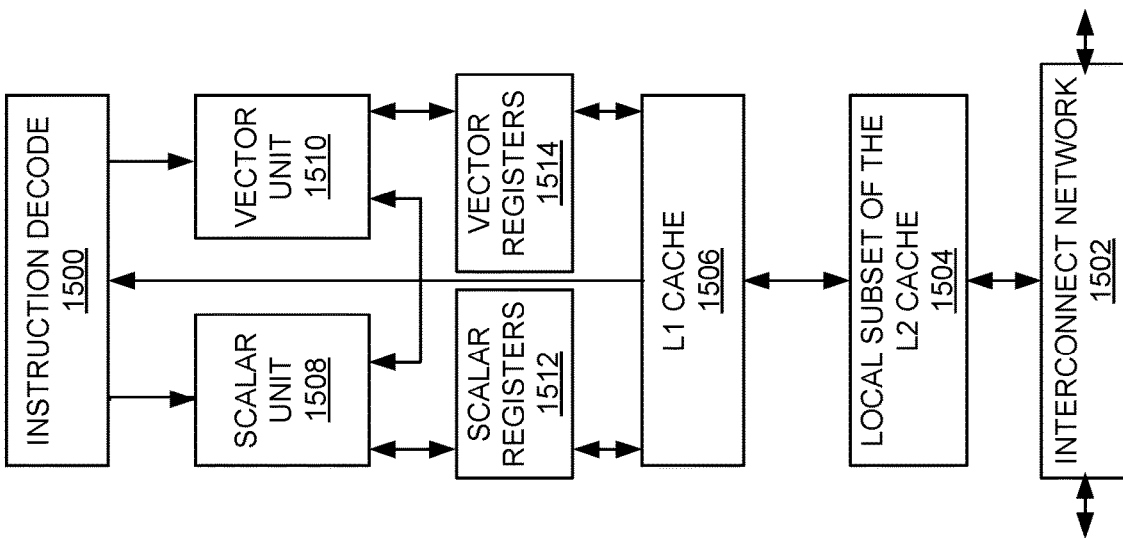

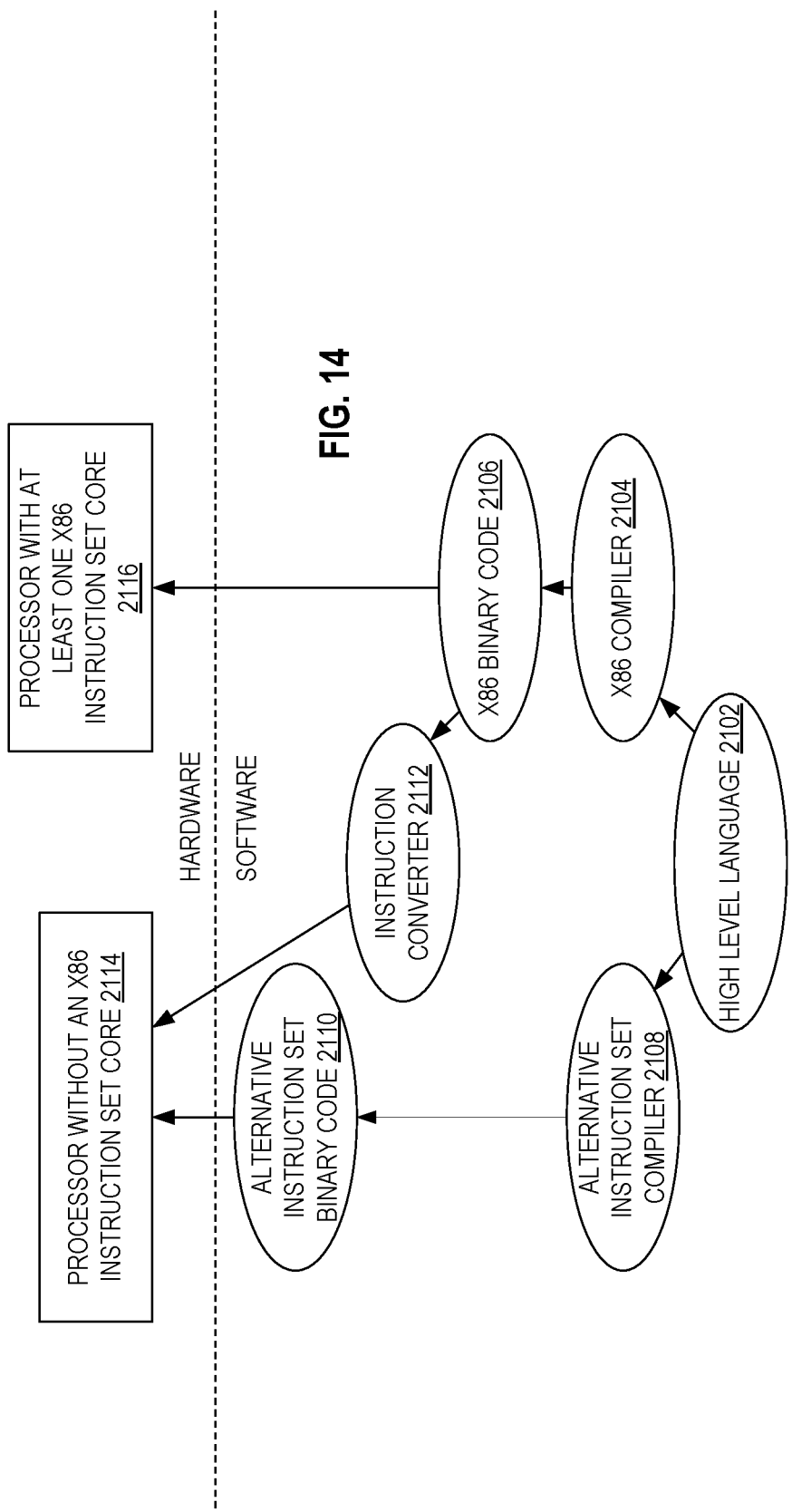

AUTONOMOUS AND EXTENSIBLE RESOURCE CONTROL BASED ON SOFTWARE PRIORITY HINT

FIELD OF INVENTION

The field of invention relates generally to computer architecture, and, more specifically, to allocating shared resources.

BACKGROUND

Processor cores in multicore processors may use shared system resources such as caches (e.g., a last level cache or LLC), system memory, input/output (I/O) devices, and interconnects. The quality of service provided to applications may be degraded and/or unpredictable due to contention for these or other shared resources.

Some processors include technologies, such as Resource Director Technology (RDT) from Intel Corporation, that enable visibility into and/or control over how shared resources such as LLC and memory bandwidth are being used by different applications executing on the processor. For example, such technologies may provide for system software to monitor resource usage and delay or prevent access to a resource or a portion of a resource.

BRIEF DESCRIPTION OF THE DRAWINGS

The present invention is illustrated by way of example and not limitation in the figures of the accompanying drawings, in which like references indicate similar elements and in which:

FIG. 1D illustrates a per resource register for priority tag to priority mapping according to embodiments;

FIG. 5A is a block diagram illustrating an exemplary specific vector friendly instruction format according to embodiments;

FIG. 5B is a block diagram illustrating the fields of the specific vector friendly instruction format that make up the full opcode field according to embodiments;

FIG. 5C is a block diagram illustrating the fields of the specific vector friendly instruction format that make up the register index field according to embodiments;

FIG. 7A is a block diagram illustrating both an exemplary in-order pipeline and an exemplary register renaming, out-of-order issue/execution pipeline according to embodiment;

FIG. 7B is a block diagram illustrating both an exemplary embodiment of an in-order architecture core and an exemplary register renaming, out-of-order issue/execution architecture core to be included in a processor according to embodiments;

FIG. 8A is a block diagram of a single processor core, along with its connection to the on-die interconnect network and with its local subset of the Level 2 (L2) cache, according to embodiments;

FIG. 8B is an expanded view of part of the processor core in FIG. 8A according to embodiments;

FIG. 14 is a block diagram contrasting the use of a software instruction converter to convert binary instructions in a source instruction set to binary instructions in a target instruction set according to embodiments.

DETAILED DESCRIPTION

Figure 1A:
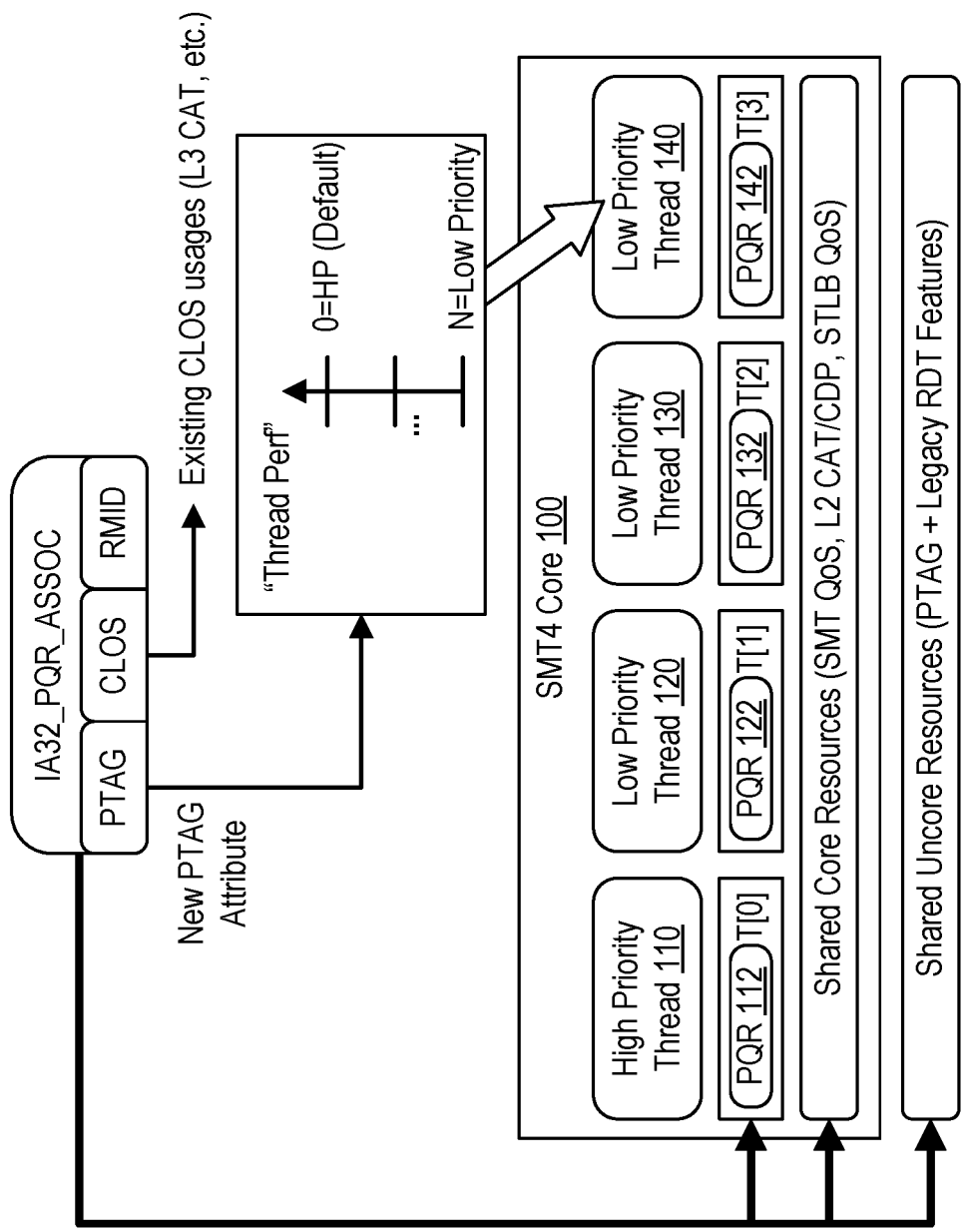
FIG. 1A is a block diagram of a processor core according to embodiments in which the allocated shared resource may be a cache and/or memory bandwidth.

In the following description, numerous specific details are set forth. However, it is understood that embodiments may be practiced without these specific details. In other instances, well-known circuits, structures, and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

As used in this specification and the claims and unless otherwise specified, the use of the ordinal adjectives "first," "second," "third," etc. to describe an element merely indicates that a particular instance of an element or different instances of like elements are being referred to and is not intended to imply that the elements so described must be in a particular sequence, either temporally, spatially, in ranking, or in any other manner. Also, as used in descriptions of embodiments of the invention, a "/" character between terms may mean that what is described may include or be implemented using, with, and/or according to the first term and/or the second term (and/or any other additional terms).

Also, the terms "bit," "flag," "field," "entry," "indicator," etc., may be used to describe any type or content of a storage location in a register, table, database, or other data structure, whether implemented in hardware or software, but are not meant to limit embodiments of the invention to any particular type of storage location or number of bits or other elements within any particular storage location. For example, the term "bit" may be used to refer to a bit position within a register and/or data stored or to be stored in that bit position. The term "clear" may be used to indicate storing or otherwise causing the logical value of zero to be stored in a storage location, and the term "set" may be used to indicate storing or otherwise causing the logical value of one, all ones, or some other specified value to be stored in a storage location; however, these terms are not meant to limit embodiments of the present invention to any particular logical convention, as any logical convention may be used within embodiments of the present invention.

In this specification and its drawings, the term "thread" and/or a block labeled "thread" may mean and/or represent an application, software thread, process, virtual machine, container, etc. that may be executed, run, processed, created, created, assigned, etc. on, by, and/or to a core.

The term "core" may mean any processor or execution core, as described and/or illustrated in this specification and its drawings and/or as known in the art, and the terms "processor core," "execution core," and "core" are meant to be synonymous. The term "uncore" may mean any circuitry, logic, sub-systems, etc. (e.g., an integrated memory controller (iMC), power management unit, performance monitoring unit, system and/or I/O controllers, etc.) in/on a processor or system-on-chip (SoC) but not within a core, as described and/or illustrated in this specification and its drawings and/or as known in the art (e.g., by the name uncore, system agent, etc.). However, use of the terms core and uncore in in the description and figures does not limit the location of any circuitry, hardware, structure, etc., as the location of circuitry, hardware, structure, etc. may vary in various embodiments.

For example, MSRs (as defined below) 104 may represent one or more registers, one or more of which may be in a core, one or more of which may be in an uncore, etc. MSRs included in embodiments, as described below, may correspond to any one or more model specific registers, machine specific registers, etc. to control and report on processor performance, handle system related functions, and may or may not be accessible to an application program. Furthermore, descriptions of embodiments including MSRs may not be limited to the use of MSRs as described; embodiments may in addition or instead use any other storage for control, configuration, state, etc. information.

The term "quality of service" (or QoS) may be used to mean or include any measure of quality of service mentioned in this specification and/or known in the art, to an individual thread, group of threads (including all threads), type of thread(s), including measures of and/or related to performance, predictability, etc. The term "memory bandwidth allocation" (or MBA) may be used to refer to a technique or the use of a technique to allocate memory bandwidth and/or a quantity of memory bandwidth allocated, provided, available, etc. or to be allocated, etc.

Embodiments of the invention may be used to in computer and information processing systems to allocate and/or enforce allocation of shared resources, such as caches and memory, and may provide improved performance and/or QoS when multiple threads with differing priorities are being and/or waiting to be executed. Embodiments may provide for software to benefit from one or more techniques or mechanisms to allocate resources, implemented in and/or controlled by hardware and/or firmware (HW-based allocation), without requiring the software to monitor or track resource usage and/or to program or configure HW-based allocation or be aware of resource allocation policies. Therefore, HW-based allocation may be performed autonomously and/or at finer granularity than the software needs to be aware of, and improvements, extensions, and additions to HW-based allocation may be implemented without requiring the software to be modified. Embodiments may also provide for resource allocation to be performed more responsively, e.g., hardware may adjust resource allocation more quickly than software in response to changing use of and demand for resources.

Aspects of some embodiments are illustrated in FIG. 1, which shows processor core 100 including hardware execution resources to execute four threads 110, 120, 130, and 140 (e.g., a simultaneous multithreading 4 or SMT4 core). In embodiments, any number of threads may execute on any number of cores (e.g., four threads on one core). In embodiments, a processor and/or core may include one or more storage locations, such as one or more machine/model specific registers (MSRs) or other control or configuration registers, shown in FIG. 1 as platform QoS registers (PQRs) 112, 122, 132, and 142, that may be programmed/configured to be associated with threads (e.g., one core-scoped PQR per thread, with other core-scoped PQRs per logical processor in other cores). Each such PQR may be programmed by software with a priority tag to be associated with a corresponding thread such that the priority tag processor hardware may use thread priority tags as part of any known or novel techniques for allocating shared resources.

In embodiments, the shared resources may include a cache may be fabricated on the same substrate (e.g., semiconductor chip or die, SoC, etc.) as processor core 100 and the memory may be on one or more separate substrates and/or in one or more packages separate from the package containing the shared cache; however, any arrangement and/or integration of shared resources (e.g., cache and/or memory) and users (e.g., cores and/or threads) in/on a substrate, chiplet, multichip module, package, etc. is possible in various embodiments.

Embodiments may include any number of cores of any architecture (e.g., an embodiment may include a heterogeneous processor or system having cores of different architectures), with any number of threads per core (e.g., an embodiment may include a first core with and/or supporting a first number of threads and a second core with and/or supporting a second (which may be different from the first) number of threads.

Figure 1B:
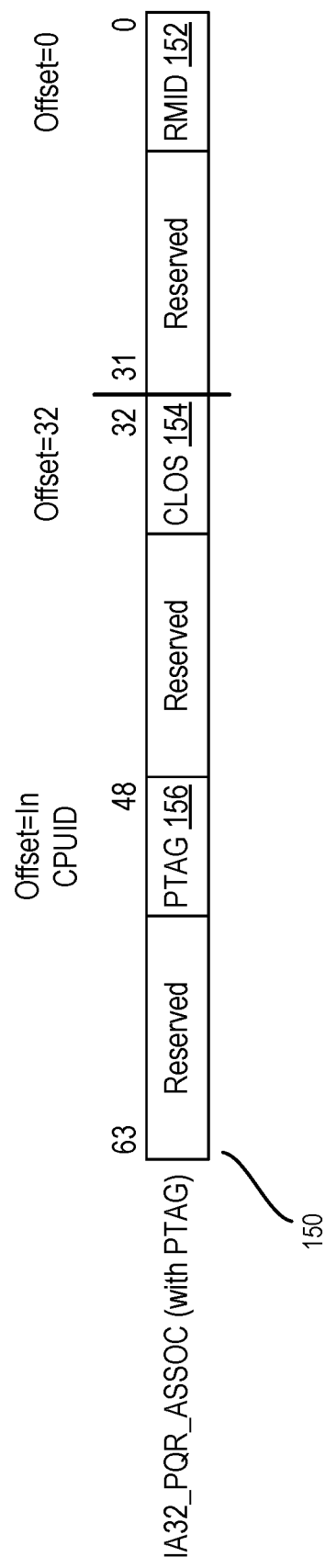
FIG. 1B illustrates a platform quality-of-service register according to embodiments.

FIG. 1B shows PQR 150, which may correspond to any or each of PQRs 112, 122, 132, and/or 142 of FIG. 1. In an embodiment, PQR 150 may represent one of several PQRs (e.g., an IA32_PQR_ASSOC according to an Intel® 64 or IA-32 architecture) in a processor or processor core. As shown, PQR 150 includes resource monitoring identification (RMID) field 152, class of service (CLOS (or COS)) field 154, and priority tag (PTAG) field 156, each of which may be shown as specific bits of PQR 150 but in various embodiments may be any bits (i.e., at any location) and/or number of bits within PQR 150. Furthermore, the least significant bit (LSB), most significant bit (MSB), and/or number of bits of any such field may depend on the processor/core or version of the processor/core, and, for example, may be detected/enumerated using a processor identification instruction (e.g., CPUID) that may indicate the information directly (e.g., by returning one or more specific bit positions) and/or indirectly (e.g., by returning an offset from bit 0 and/or a size of the field).

For example, the least significant bit (LSB) of RMID field 152 may be bit 0 of PQR 150, the most significant bit (MSB) of RMID field 152 may be bit 9 of PQR 150, the LSB of CLOS field 154 may be bit 32 of PQR 150, the LSB of PTAG field 156 may be bit 48 of PQR 150, and/or the MSB of PTAG field 156 may be any of bits 49 to 63 of PQR 150 (e.g., detectable/enumerable using a CPUID instruction).

In embodiments, a physical processor may provide one PQR, such as PQR 150, per logical processor (e.g., a hardware thread), such that software may program the RMID field of a PQR with a software-defined RMID value to identify a thread to be executed or scheduled for execution on the logical processor corresponding to that PQR. Software may also program that PQR with one or both of a CLOS value and a PTAG value to be associated with the thread identified by the RMID value. The CLOS value may be used as a resource control tag into which the thread may be grouped. The PTAG value may be used to provide an indication of thread's priority, relative to other threads, such that hardware may use the PTAG value to allocate a share of and/or access to one or more resources to the thread. In embodiments, the PTAG value may be a hint, such that hardware may but is not required to use the value.

In embodiments, CLOS values may be used, to directly control resources, by software that is aware of the resource control mechanisms, such as in a server computer system; whereas PTAG values may be used, to indirectly influence hardware allocation of resources, by software that may be unaware of the resource allocation mechanisms, such as in a client computer system. Thus, embodiments provide for CLOS values to be used to allow software to make resource control and allocation decisions, and more abstract values, PTAG values, to be used to allow hardware/firmware to make resource control and allocation decisions based on indications of relative thread priorities from software. Embodiments may provide for PTAG values to be used, as described/enabled in/by this specification, alone or in combination with any known (e.g., cache allocation as shown in FIG. 1) or novel usages of CLOS values.

In embodiments, PQRs may be programmed and/or re-programmed during context switches to provide for desired configurations to be applied to each thread to be executed.

Returning to FIG. 1A, software may program each of PQRs 112, 122, 132, and 142 with a CLOS value, which may be the same as or different from any the other CLOS values, such resources may be controlled based on CLOS values. To provide for this resource control, a processor may also include one or more programmable MSRs per CLOS that software may also program to define control policies per CLOS. As an example, a first set of MSRs (e.g., capacity bitmask or CBM MSRs) may be programmed to define which ways of a shareable cache (e.g., and last-level cache (LLC) or level 3 (L3) cache) may be used by threads of each CLOS. As another example, a second set of MSRs (e.g., MBA delay MSRs) may be programmed to define which MBA values (e.g., levels of delay or throttling) are to be used for threads of each CLOS. Other uses of CLOS values for resource control are possible.

In addition or instead, software may program each of PQRs 112, 122, 132, and 142 with a PTAG value, which may be the same as or different from any of the other PTAG values, such that hardware may allocate resources to threads according to PTAG values and/or priorities derived from PTAG values. Therefore, software may assign PTAG values to threads, but otherwise cede control of monitoring, allocation, and allocation enforcement to hardware/firmware, allowing hardware/firmware to bias and balance, and attempt to optimize for power and performance, the use of resources based on thread priority.

For example, embodiments may provide for work-conserving, rather than fixed, allocation and re-allocation of resources, such that a thread may be given access to a resource not being used by a higher priority thread. Embodiments providing for hardware controlled, work-conserving allocation may prevent negative impacts to performance and/or battery life due to resource allocation to threads that are high priority but inactive. Also, embodiments may provide for thread priorities, based on PTAGs, to be used in allocating micro-architectural resources to which architectural (e.g., through MSRs) control is not provided, whether these resources and/or the mechanisms for allocating these resources are within or external to the processor and/or presently defined (i.e., the use of PTAGs to allocate resources is extensible to graphics and other co-processors and/or to future resources and allocation mechanisms, without changes to software). Similarly, by providing for work-conserving resource allocation based on thread priority rather than fixed allocation, embodiments may provide for allocation of LLC, memory bandwidth, etc. to graphics and other co-processors. The use of embodiments may provide benefits in heterogenous/hybrid processors/SoCs (e.g., to avoid a low priority thread from having a fixed allocation of a resource (e.g., LLC or memory) that is needed by a high-compute engine).

In embodiments, software may assign PTAG values to threads based on any desired considerations or factors, such as desired QoS, priority, importance, foreground versus background, etc. (which may provide more flexibility for client systems than existing techniques based on a multi-tenant approach designed for server systems).

Then, hardware may use the PTAG values and/or thread priorities derived from PTAG values to allocate resources (core, uncore, power, etc.). For example, FIG. 1 depicts PTAG values being used to allocate shared core resources (simultaneous multithreading (SMT) resources, a cache dedicated to a core (e.g., a level 2 (L2) cache to which cache allocation technology (CAT) and/or code/data prioritization (CDP) techniques may be applied), a shared translation lookaside buffer (STLB)) and/or shared uncore resources (e.g., resources that may be shared/allocated according to any novel or known (RDT, etc.) techniques).

Figure 1C:
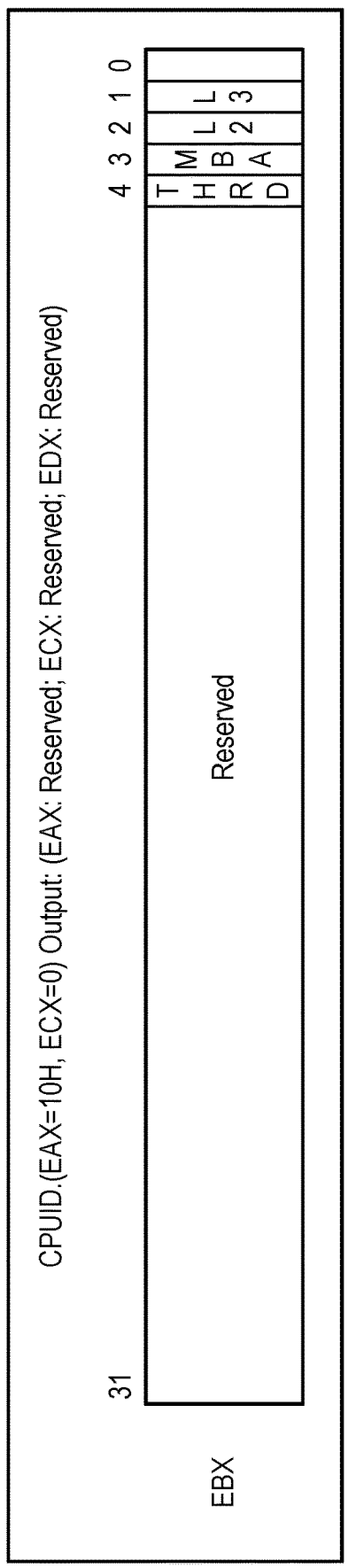
FIG. 1C illustrates a technique for indicating feature support according to embodiments.

FIG. 1C shows an example of a processor indicating support for an embodiment. As shown in FIG. 1C, in response to an instruction (e.g., in an Intel® x86 processor, a CPUID instruction executed with EAX=10H and ECX=00H), a processor register (e.g., EBX) may return an indication (e.g., in bit 4) of whether a shared resource allocation based on thread priority feature (THRD) according to an embodiment is supported, as well as whether other shared resource monitoring/allocation features are supported (e.g., bit 3 for MBA, bit 2 for L2 cache, bit 1 for L3 cache).

Further details of support for embodiments may be also be detected/enumerated with an instruction (e.g., a CPUID instruction executed with EAX=10H and ECX=04H, where the value of 04H in ECX may be defined as the resource identifier for the thread priority feature) that returns a first value (e.g., in EAX bits 7:0) to indicate the number of priorities supported (e.g., the first value minus 1), a second value (e.g., in EDX bits 16:0) to indicate the number of PTAG values supported (e.g., the second value minus 1), and a third value (e.g. in EDX bits 23:16) to indicate the offset, from bit 0, of the PTAG field in the PQR (e.g., as shown in FIG. 1B).

In embodiments, hardware/firmware may manage multiple shared resources based on a PTAG value by providing for per resource mappings of PTAG values to priority values. For example, multiple (e.g., one per resource) PTAG-to-Priority mapping MSRs may be provided to allow software to configure a mapping of PTAG values to different priorities for each resource. These MSRs may be package scoped, such that the mappings may be applied to resources shared across any or all processors/cores in a package. FIG. 1D illustrates one such PTAG-to-Priority MSR (IA32_Thread_QOS_Priority_n, where n indicates the resource) according to an embodiment, in which bits 7:0 are to map a first PTAG value (e.g., 0) to a first priority value, bits 15:8 are to map a second PTAG value (e.g., 1) to a second priority value, and bits 23:16 are to map a third PTAG value (e.g., 2) to a third priority value.

Various embodiments may provide allow software to program PTAG-to-Priority MSRs to configure the mappings, and/or, for ease of use, provide mappings (e.g., by preconfiguring PTAG-to-Priority MSRs with default values or hardwiring default values). In embodiments, an instruction (e.g., a CPUID instruction executed with EAX=10H and ECX=04H, as described above, may return a first value (e.g., in EDX bit 24) to indicate whether default PTAG-to-priority configuration is supported, and/or a second value (e.g., in EDX bit 25) to indicate whether programmable PTAG-to-priority configuration is supported. Therefore, embodiments provide the ability to extend the resources managed without additional software support. In embodiments, any resource that could support a priority-based work-conserving algorithm may be supported and pre-configured such that existing software would work, unmodified, to support additional hardware resources. Hardware algorithms for providing priority-based support could also be modified/improved without software changes. However, embodiments provide the capability for software to override the default configuration, for example, if software is modified.

Figure 2A:
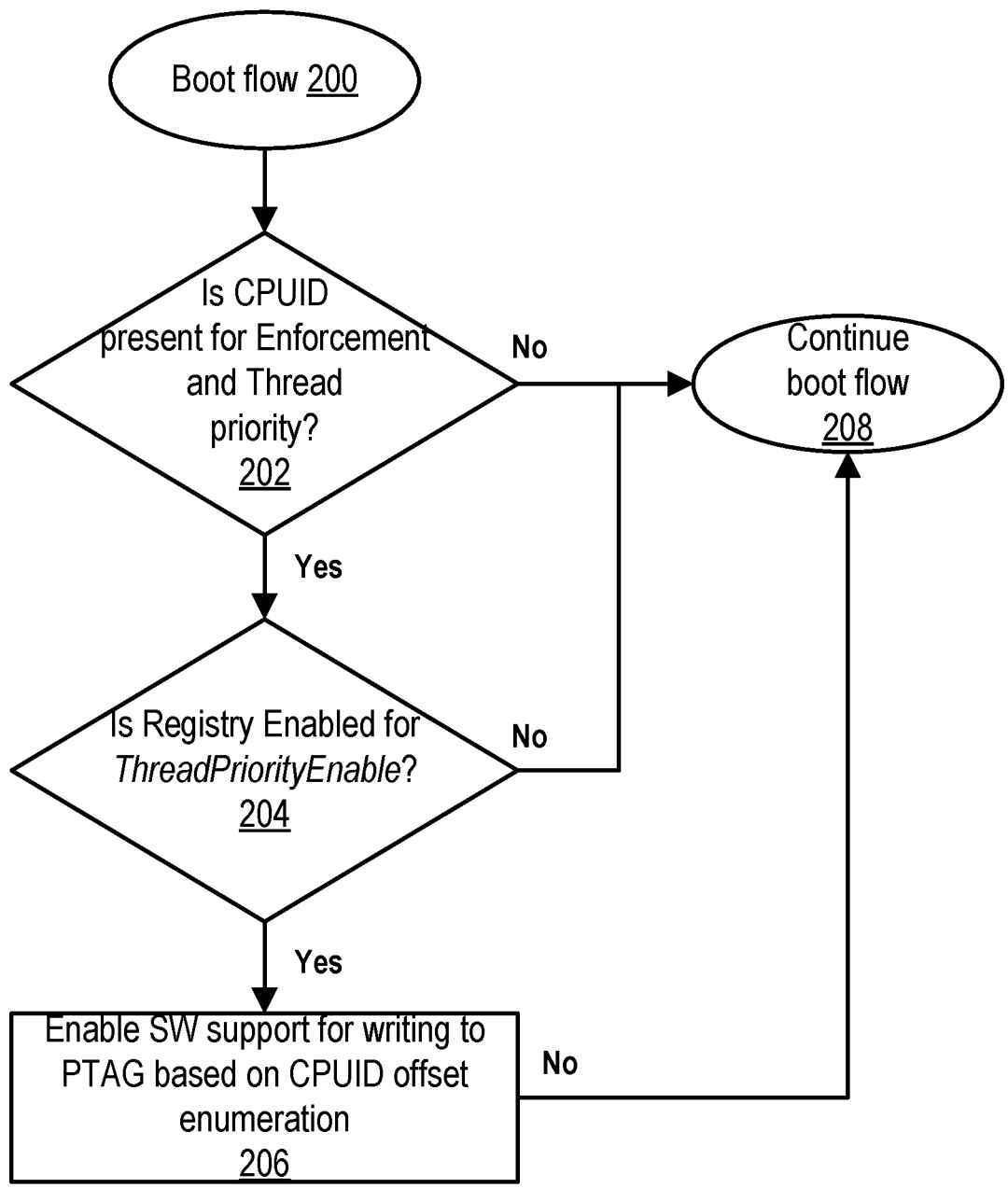
FIG. 2A illustrates a method according to embodiments.

FIG. 2A illustrates a system boot flow 200 for using an embodiment. In 202, boot flow begins. In 204, it is determined (e.g., using a CPUID instruction) whether hardware supports a shared resource allocation using thread priority feature according to an embodiment. If not, then in 208, boot flow continues (without the feature enabled). If so, then in 204, it is determined whether software supports using the feature (e.g., whether it is enabled in the Windows Registry). If not, then in 208, boot flow continues (without the feature enabled). If so, then in 206, the software support for the feature is enabled, then in 208, boot flow continues (with the feature enabled).

In embodiments, after the feature is enabled, software (e.g., an operating system (OS) such as Windows) may use one or more CPUID instructions (as described above) to detect the details of support for the feature, such as the number of priority values, the number of PTAG values, and the PTAG field offset. Software may then categorize into various levels to use as PTAG values, where the levels may be based on desired QoS, priority, importance, foreground versus background, etc. For example, the levels may correspond to the type of task/process indicated by Windows Task Manager, which may include App, Background Process, and Windows Process. For additional tuning control, additional factors (e.g., Windows Registry controls) may be leveraged. For example, PTAG values may correspond to priorities of tasks/processes as follows (and as illustrated in FIG. 1A), where the lowest PTAG value (e.g., 0) is used for the highest priority task/process and increasing PTAG value, up to a maximum PTAG value, are used for decreasing priority:

Background: PTAG level to set for background work; value for threads at this level may be preconfigured to be the maximum value (e.g., the number of PTAG values supported minus 1)

Default: PTAG level to set for foreground work; value for threads at this level may preconfigured to be the minimum value (e.g., 0)

Medium: PTAG level to set for medium QoS work; value for threads at this level may be preconfigured to be the maximum level (e.g., the number of PTAG values supported minus 1)

Multimedia: PTAG level to be set for multimedia QoS work; value for threads at this level may be preconfigured to be the minimum value (e.g., 0)

Figure 2B:
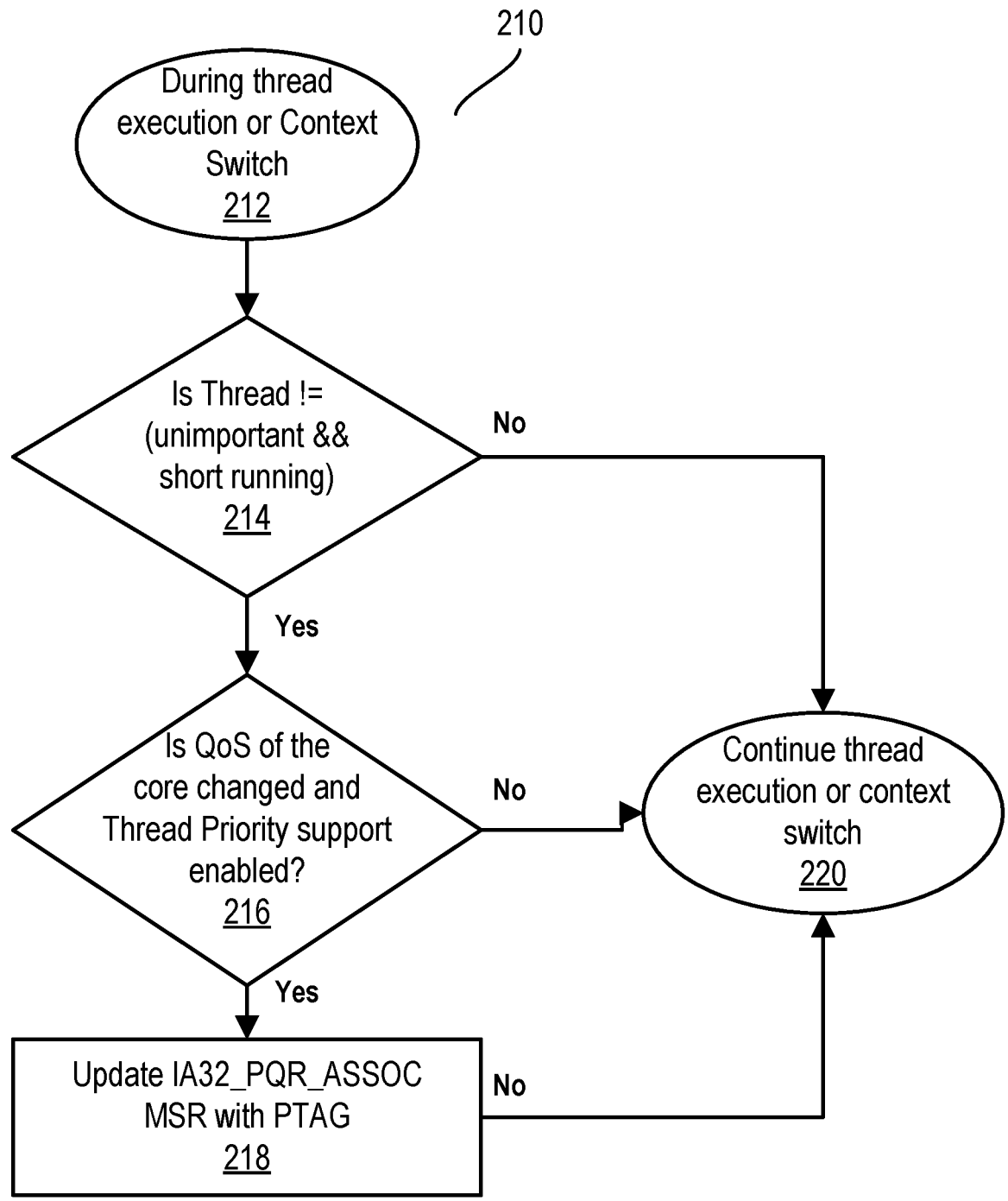
FIG. 2B illustrates a method according to embodiments.

In embodiments, after determining PTAG values per thread (e.g., as described above, based on level, registry configuration, constraints of PTAG and priority levels, and/or the size/offset of the PTAG field), software (e.g., the OS) may write one or more PTAG values to PQR PTAG fields for one or more threads, as shown in method 210 of FIG. 2B, for example.

In 212 of method 210, a software thread is being executed or switched out by a context switch. In 214, it is determined whether the thread is both unimportant and short running. If so (i.e., there is no reason to change PTAG value of thread running or being switched out), then in 220, thread execution or the context switch continues. If not, then in 216, it is determined whether the QoS for the core changed and the thread priority feature is enabled. If not, then in 220, thread execution the context switch continues. If so, then in 218, the PTAG value in the corresponding PQR is updated, then, in 220, thread execution or the context switch continues.

Then, based on PTAG values programmed into PQRs, shared resource management (which may include management of core resources, management of uncore resources, and power management) may be performed autonomously by hardware and/or firmware. As opposed to fixed allocations of shared resources as may be performed according to existing software-controlled techniques (e.g., RDT using CLOS values), embodiments provide for priority-based work-conserving allocation, such that lower priority threads may access resources not being consumed by higher priority threads.

Embodiments may provide control over which resources are allocated based on thread priority hints from software. For example, embodiments may provide a first new MSR (THREAD_PRIORITY_FEATURE_SUPPORT MSR), which may be read-only, having a first bit (e.g., bit 0), that if set to 1, indicates that a first resource (e.g., memory bandwidth) may be allocated based on thread priority hints, a second bit (e.g., bit 1), that if set to 1, indicates that a second resource (e.g., an LLC) may be allocated based on thread priority hints, etc. In embodiments, any or all such bits may be set to 1 by default. Also or instead, embodiments may provide a second new MSR (THREAD_PRIORITY_FEATURE_CONTROL MSR), which may be read-write, having a first bit (e.g., bit 0), that if set to 1, enables allocation of a first resource (e.g., memory bandwidth) based on thread priority hints, a second bit (e.g., bit 1), that if set to 1, enables allocation of a second resource (e.g., an LLC) based on thread priority hints, etc. In embodiments, any or all such bits may be set to 1 by default and/or programmable to allow software to clear them to disable allocation of the corresponding resource based on thread priority hints.

Figure 3A:
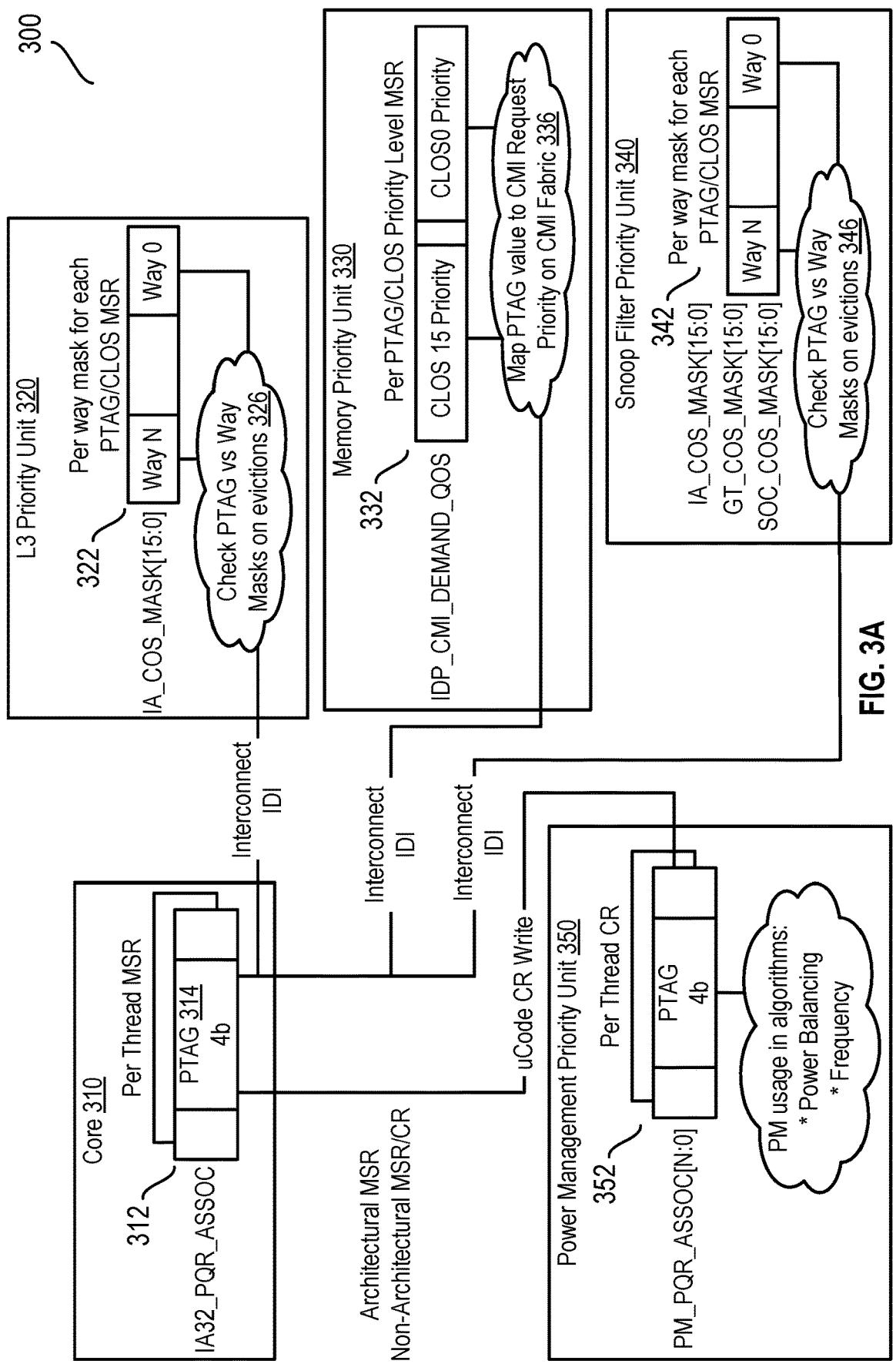
FIG. 3A illustrates an interface between software and hardware according to embodiments.

FIG. 3A illustrates an interface between software and hardware/firmware according to embodiments in processor (or SoC) 300. PQR 312 in core 310 may be programmed with PTAG value 314. PQR 312 is an architectural MSR, such that it may be programmed by software. On the other hardware, each of LLC priority register(s) 322 in L3 priority unit 320, memory priority register(s) 332 in memory priority unit 330, snoop filter priority register(s) 342 in snoop filter priority unit 340, and power management priority register(s) 352, each of which may be in one or more units of an uncore or system agent, are non-architectural MSRs or control register that may be loaded by or in response to microcode, firmware, and/or intra-interconnect (IDI) messages based on the content of PQR 312. In embodiments, each or any of L3 priority unit 320, memory priority unit 330, and snoop filter priority unit 340 may represent, correspond to, include, be included in, implement, be implemented as, etc. a cache capacity filter (CCF), cache control circuitry, memory control circuitry, a caching agent, a home agent, a caching-home agent, home agent controller (HAC), etc.

In embodiments, PTAG value 314 may be mapped, converted, translated, or otherwise used, by hardware/firmware 326, 336, and/or 346, into and/or to generate/provide one or more priority, CLOS, mask, etc. values to be stored in priority registers 322, 332, and/or 342, respectively, such that hardware/firmware may control resources based on content of these priority registers. For example, bitmasks for cache allocation and/or snoop filtering, delay or throttling values for MBA, etc., used by hardware/firmware, may be based on PTAG values provided by software. In embodiments, PTAG values themselves may be used by hardware/firmware for managing/allocating resources, such as for power management, power balancing, frequency control, etc.

Figure 3B:
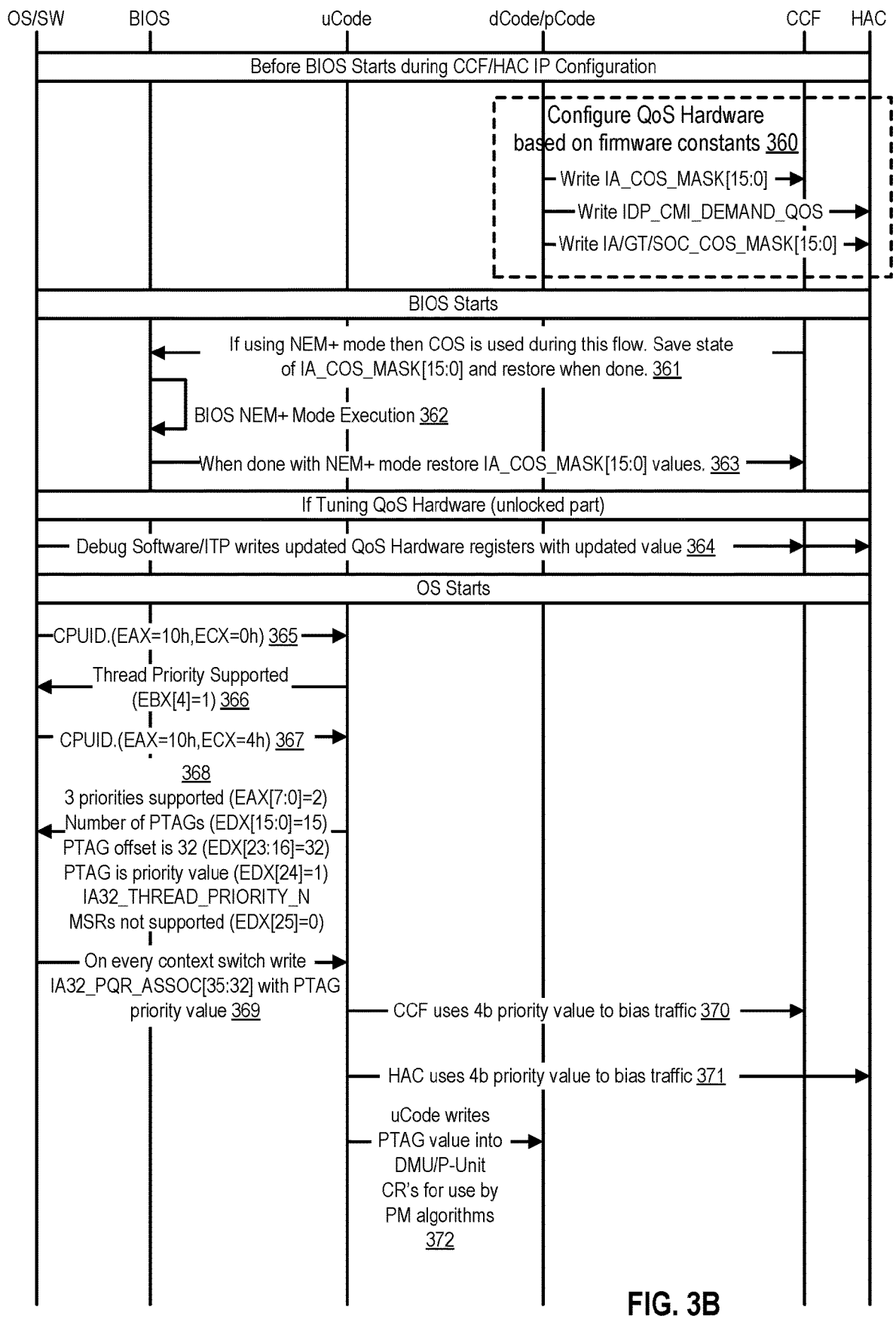
FIG. 3B illustrates a method according to embodiments.

FIG. 3B illustrates a method of setting up and using thread priority hints for resource control/allocation according to embodiments. In embodiments, the method may be performed by and/or in response to software (e.g., an OS), a basic input/output system (BIOS), microcode, firmware, hardware, etc., as shown in FIG. 3B.

In 360, resource allocation hardware and/or control logic/storage may be configured (e.g., with write commands from firmware) based on constraints supplied by firmware constants. In 361, configuration information (e.g., the content of bitmask registers for cache allocation) may be stored while BIOS executes. In 362, BIOS executes. In 363, resource allocation hardware and/or control logic storage may be reconfigured using the configuration information stored in 361. Note that 361 and 363 may be included in the method to provide for BIOS to execute in no-evict mode (NEM).

In 364, resource allocation hardware and/or control logic/storage configuration may be updated (e.g., by debug software) based on tuning/calibration of QoS hardware, firmware, parameters, etc.

In 365, software (e.g., an OS) invokes a first CPUID instruction (as described above) to determine if resource allocation based on thread priority hints according to embodiments is supported. In 366, an indication of support for resource allocation based on thread priority hints according to embodiments is returned (e.g., EBX[4]=1). In 367, software invokes a second CPUID instruction to determine details of support for resource allocation based on thread priority hints according to embodiments. In 368, details (e.g., number of priorities supported, number of PTAGs supported, PTAG field offset, PTAGs to priority mapping is (or is not) preconfigured, per resource PTAG to priority mapping MSRs are not (or are) supported) is returned.

In 369, on a context switch, software (e.g., the OS) writes, to the PQR corresponding thread to be executed, a PTAG value for that thread. This write may be the same write with which a thread ID for that thread is written to the PQR.

In 370, hardware/firmware uses the PTAG value or one or more values/masks derived from the PTAG value to configure set up, perform, and/or enforce one or more cache allocation techniques (e.g., to bias traffic to/from a cache). In 371, hardware/firmware uses the PTAG value or one or more values derived from the PTAG value to configure, set up, perform, and/or enforce one or more MBA techniques (e.g., to bias traffic to/from a memory). In 372, hardware/firmware uses the PTAG value or one or more values derived from the PTAG value to configure, set up, perform, and/or enforce one or more power management algorithms/techniques.

Any or any combination of these hardware/firmware resource allocation/management techniques may be used (e.g., as in 370, 371, and 372) in various embodiments. Furthermore, embodiments provide for other/additional hardware/firmware resource allocation/management techniques (e.g., of other/additional resource) to be performed based on PTAG values with no change to the software (e.g., the OS) that writes PTAG values to PQRs. For example, embodiments may provide for a new/additional resource to be controlled directly using CLOS values in new/modified MSRs that the software may be modified to use, and to be managed indirectly based on PTAG values that the software does not need to be modified to use.

Embodiments may also provide for PTAG values to be saved and restored as part of an existing context switch flow (e.g., using MSR list and/or XSAVE/XRSTOR instructions) to reduce the context switch overhead of support for PTAG values.

Figure 3C:
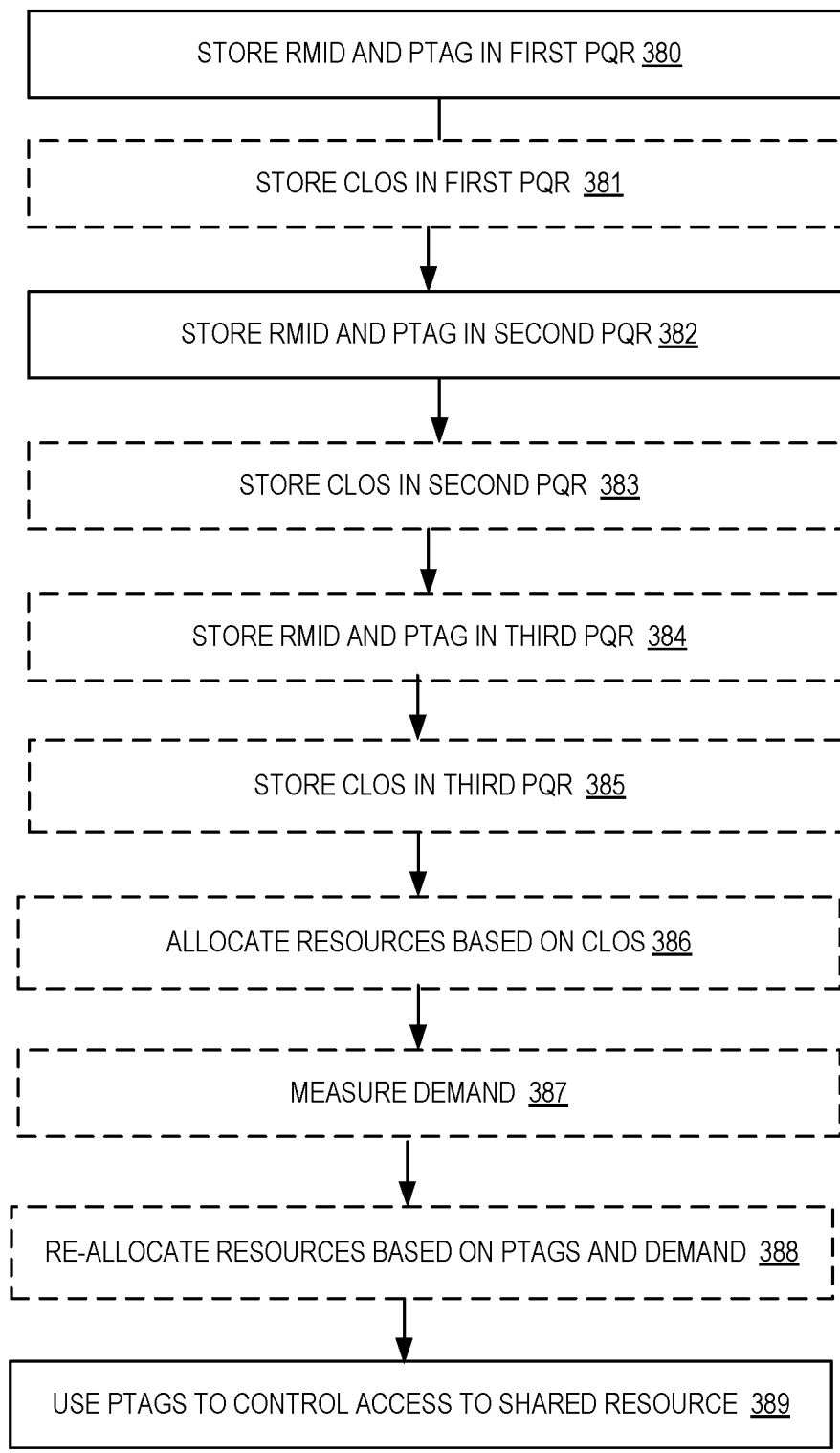
FIG. 3C illustrates a method according to embodiments.

FIG. 3C illustrates a method for resource control based on software priority according to embodiments. In the method, storing RMIDs, PTAGs, and/or CLOSs may correspond to and/or be in response to instructions from PQRs may be programmed by system software, as described above In 380, an RMID and a PTAG are stored in a first PQR in a first core. In 381, a CLOS may be stored in the first PQR. In 382, an RMID and a PTAG are stored in a second PQR in the first core. In 383, a CLOS may be stored in the second PQR. In 384, an RMID and a PTAG may be stored in a third PQR in a second core. In 385, a CLOS may be stored in the third PQR.

In 386, resources and/or portions of resources may be allocated to threads, for example as known and/or described above/below. In 387, dynamic demand for one or more resources and/or portions of resources may be measured, for example as known and/or described above/below. In 388, one or more resources and/or portions of resources may be re-allocated to one or more threads based on PTAGs and demand. In 389. PTAGs are used to control access to shared resources and/or portions of resources.

Additional Description

Described below are mechanisms, including instruction sets, to support systems, processors, and emulation. For example, what is described below details aspects of instruction execution including various pipeline stages such as fetch, decode, schedule, execute, retire, etc. that may be used in a core according to embodiments.

Different figures may show corresponding aspects of embodiments. For example, any and/or of the blocks in FIG. 1 may correspond to blocks in other figures. Furthering the example, a block representing a core in FIG. 1 may correspond to a block representing a core in any of the other figures, such as in a block diagram of a system according to an embodiment. As such, an embodiment represented by that system-level block diagram may include any of the blocks shown in other figures as well as any of the details in the descriptions of those other figures. The same is true for figures depicting an SoC, a multicore processor, etc.

Instruction Sets

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream may have specific contents in the operand fields that select specific operands. A set of single instruction multiple data (SIMD) extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, September 2014; and see Intel® Advanced Vector Extensions Programming Reference, October 2014).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations with the vector friendly instruction format.

Figure 4A:
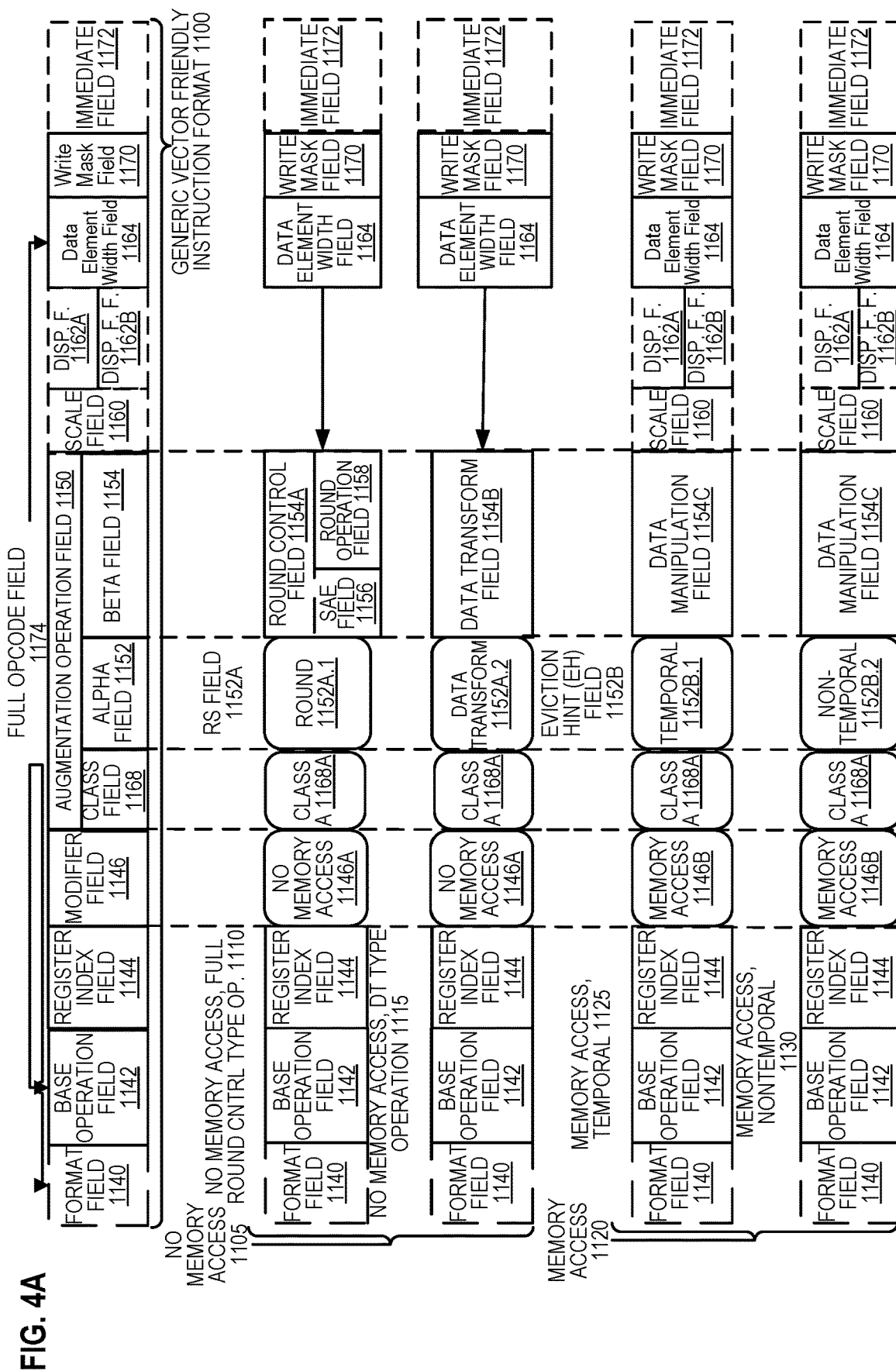
FIG. 4A is a block diagram illustrating a generic vector friendly instruction format and class A instruction templates thereof according to embodiments.
Figure 4B:
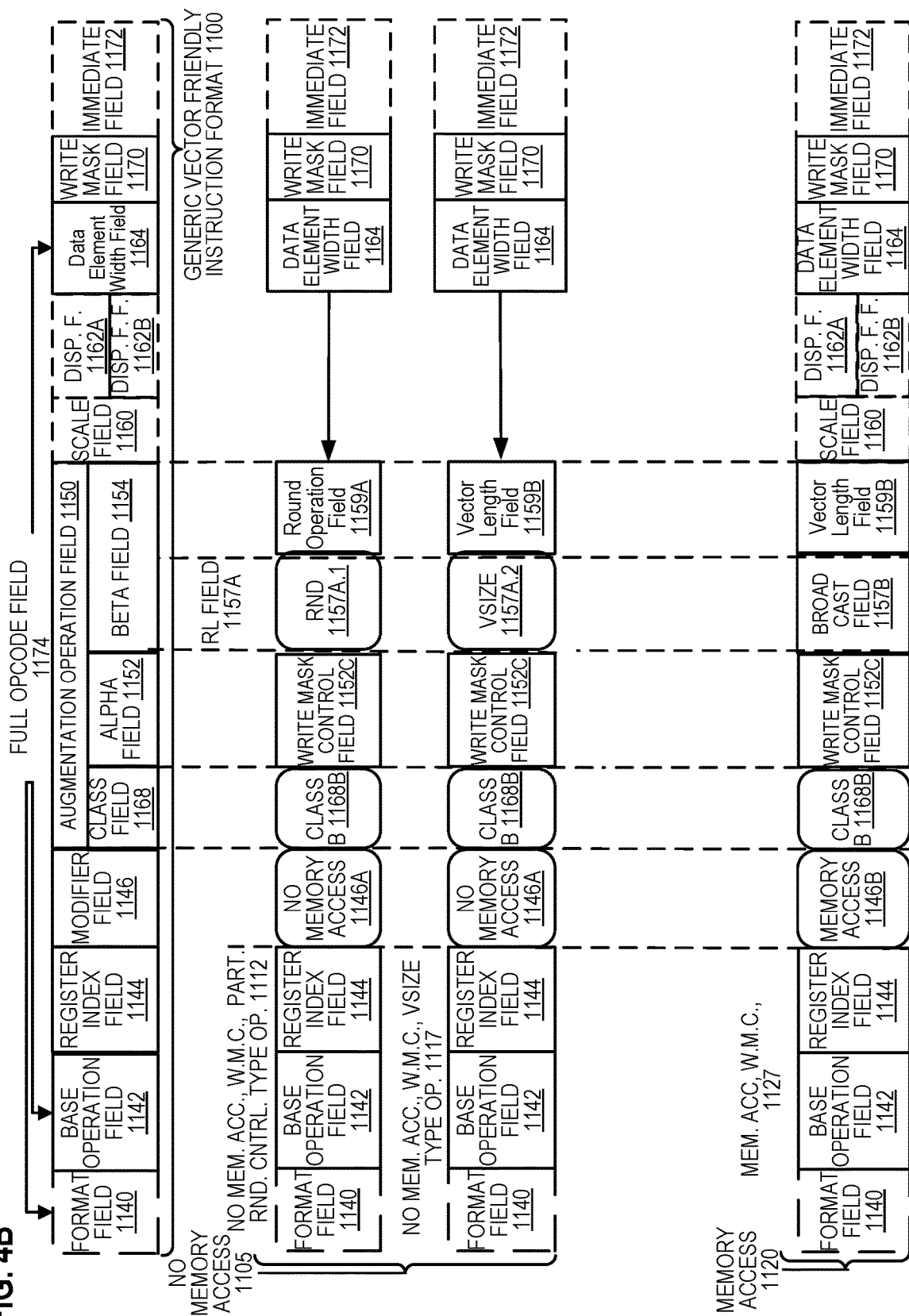
FIG. 4B is a block diagram illustrating the generic vector friendly instruction format and class B instruction templates thereof according to embodiments.

FIGS. 4A-4B are block diagrams illustrating a generic vector friendly instruction format and instruction templates thereof according to embodiments. FIG. 4A is a block diagram illustrating a generic vector friendly instruction format and class A instruction templates thereof according to embodiments; while FIG. 4B is a block diagram illustrating the generic vector friendly instruction format and class B instruction templates thereof according to embodiments. Specifically, a generic vector friendly instruction format 1100 is shown, for which are defined class A and class B instruction templates, both of which include no memory access 1105 instruction templates and memory access 1120 instruction templates. The term generic in the context of the vector friendly instruction format refers to the instruction format not being tied to any specific instruction set.

While embodiments will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 4A include: 1) within the no memory access 1105 instruction templates there is shown a no memory access, full round control type operation 1110 instruction template and a no memory access, data transform type operation 1115 instruction template; and 2) within the memory access 1120 instruction templates there is shown a memory access, temporal 1125 instruction template and a memory access, non-temporal 1130 instruction template. The class B instruction templates in FIG. 4B include: 1) within the no memory access 1105 instruction templates there is shown a no memory access, write mask control, partial round control type operation 1112 instruction template and a no memory access, write mask control, vsize type operation 1117 instruction template; and 2) within the memory access 1120 instruction templates there is shown a memory access, write mask control 1127 instruction template.

The generic vector friendly instruction format 1100 includes the following fields listed below in the order illustrated in FIGS. 4A-4B.

Format field 1140—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 1142—its content distinguishes different base operations.

Register index field 1144—its content, directly or through address generation, specifies the locations of the source and destination operands, be they in registers or in memory. These include a sufficient number of bits to select N registers from a P×Q (e.g., 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 1146—its content distinguishes occurrences of instructions in the generic vector instruction format that specify memory access from those that do not; that is, between no memory access 1105 instruction templates and memory access 1120 instruction templates. Memory access operations read from and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 1150—its content distinguishes which one of a variety of different operations to be performed in addition to the base operation. This field is context specific. In one embodiment, this field is divided into a class field 1168, an alpha field 1152, and a beta field 1154. The augmentation operation field 1150 allows common groups of operations to be performed in a single instruction rather than 2, 3, or 4 instructions.

Scale field 1160—its content allows for the scaling of the index field's content for memory address generation (e.g., for address generation that uses $2^{scale}*\text{index}+\text{base}$).

Displacement Field 1162A—its content is used as part of memory address generation (e.g., for address generation that uses $2^{scale}*\text{index}+\text{base}+\text{displacement}$).

Displacement Factor Field 1162B (note that the juxtaposition of displacement field 1162A directly over displacement factor field 1162B indicates one or the other is used)—its content is used as part of address generation; it specifies a displacement factor that is to be scaled by the size of a memory access (N)—where N is the number of bytes in the memory access (e.g., for address generation that uses $2^{scale}*\text{index}+\text{base}+\text{scaled displacement}$). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 1174 (described later herein) and the data manipulation field 1154C. The displacement field 1162A and the displacement factor field 1162B are optional in the sense that they are not used for the no memory access 1105 instruction templates and/or different embodiments may implement only one or none of the two.

Data element width field 1164—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 1170—its content controls, on a per data element position basis, whether that data element position in the destination vector operand reflects the result of the base operation and augmentation operation. Class A instruction templates support merging-write-masking, while class B instruction templates support both merging- and zeroing-write-masking. When merging, vector masks allow any set of elements in the destination to be protected from updates during the execution of any operation (specified by the base operation and the augmentation operation); in one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 1170 allows for partial vector operations, including loads, stores, arithmetic, logical, etc. While embodiments are described in which the write mask field's 1170 content selects one of a number of write mask registers that contains the write mask to be used (and thus the write mask field's 1170 content indirectly identifies that masking to be performed), alternative embodiments instead or additional allow the mask write field's 1170 content to directly specify the masking to be performed.

Immediate field 1172—its content allows for the specification of an immediate. This field is optional in the sense that it is not present in an implementation of the generic vector friendly format that does not support immediate and it is not present in instructions that do not use an immediate.

Class field 1168—its content distinguishes between different classes of instructions. With reference to FIGS. 4A-B, the contents of this field select between class A and class B instructions. In FIGS. 4A-B, rounded corner squares are used to indicate a specific value is present in a field (e.g., class A 1168A and class B 1168B for the class field 1168 respectively in FIGS. 4A-B).

Instruction Templates of Class A

In the case of the non-memory access 1105 instruction templates of class A, the alpha field 1152 is interpreted as an RS field 1152A, whose content distinguishes which one of the different augmentation operation types are to be performed (e.g., round 1152A.1 and data transform 1152A.2 are respectively specified for the no memory access, round type operation 1110 and the no memory access, data transform type operation 1115 instruction templates), while the beta field 1154 distinguishes which of the operations of the specified type is to be performed. In the no memory access 1105 instruction templates, the scale field 1160, the displacement field 1162A, and the displacement scale filed 1162B are not present.

No-Memory Access Instruction Templates—Full Round Control Type Operation

In the no memory access full round control type operation 1110 instruction template, the beta field 1154 is interpreted as a round control field 1154A, whose content(s) provide static rounding. While in the described embodiments the round control field 1154A includes a suppress all floating-point exceptions (SAE) field 1156 and a round operation control field 1158, alternative embodiments may support (e.g., may encode) both these concepts into the same field or only have one or the other of these concepts/fields (e.g., may have only the round operation control field 1158).

SAE field 1156—its content distinguishes whether or not to disable the exception event reporting; when the SAE field's 1156 content indicates suppression is enabled, a given instruction does not report any kind of floating-point exception flag and does not raise any floating-point exception handler.

Round operation control field 1158—its content distinguishes which one of a group of rounding operations to perform (e.g., Round-up, Round-down, Round-towards-zero and Round-to-nearest). Thus, the round operation control field 1158 allows for the changing of the rounding mode on a per instruction basis. In one embodiment where a processor includes a control register for specifying rounding modes, the round operation control field's 1158 content overrides that register value.

No Memory Access Instruction Templates—Data Transform Type Operation

In the no memory access data transform type operation 1115 instruction template, the beta field 1154 is interpreted as a data transform field 1154B, whose content distinguishes which one of a number of data transforms is to be performed (e.g., no data transform, swizzle, broadcast).

In the case of a memory access 1120 instruction template of class A, the alpha field 1152 is interpreted as an eviction hint field 1152B, whose content distinguishes which one of the eviction hints is to be used (in FIG. 4A, temporal 1152B.1 and non-temporal 1152B.2 are respectively specified for the memory access, temporal 1125 instruction template and the memory access, non-temporal 1130 instruction template), while the beta field 1154 is interpreted as a data manipulation field 1154C, whose content distinguishes which one of a number of data manipulation operations (also known as primitives) is to be performed (e.g., no manipulation; broadcast; up conversion of a source; and down conversion of a destination). The memory access 1120 instruction templates include the scale field 1160, and optionally the displacement field 1162A or the displacement scale field 1162B.

Vector memory instructions perform vector loads from and vector stores to memory, with conversion support. As with regular vector instructions, vector memory instructions transfer data from/to memory in a data element-wise fashion, with the elements that are actually transferred dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 1152 is interpreted as a write mask control (Z) field 1152C, whose content distinguishes whether the write masking controlled by the write mask field 1170 should be a merging or a zeroing.

In the case of the non-memory access 1105 instruction templates of class B, part of the beta field 1154 is interpreted as an RL field 1157A, whose content distinguishes which one of the different augmentation operation types are to be performed (e.g., round 1157A.1 and vector length (VSIZE) 1157A.2 are respectively specified for the no memory access, write mask control, partial round control type operation 1112 instruction template and the no memory access, write mask control, VSIZE type operation 1117 instruction template), while the rest of the beta field 1154 distinguishes which of the operations of the specified type is to be performed. In the no memory access 1105 instruction templates, the scale field 1160, the displacement field 1162A, and the displacement scale filed 1162B are not present.

In the no memory access, write mask control, partial round control type operation 1112 instruction template, the rest of the beta field 1154 is interpreted as a round operation field 1159A and exception event reporting is disabled (a given instruction does not report any kind of floating-point exception flag and does not raise any floating-point exception handler).

Round operation control field 1159A—just as round operation control field 1158, its content distinguishes which one of a group of rounding operations to perform (e.g., Round-up, Round-down, Round-towards-zero and Round-to-nearest). Thus, the round operation control field 1159A allows for the changing of the rounding mode on a per instruction basis. In one embodiment where a processor includes a control register for specifying rounding modes, the round operation control field's 1159A content overrides that register value.

In the no memory access, write mask control, VSIZE type operation 1117 instruction template, the rest of the beta field 1154 is interpreted as a vector length field 1159B, whose content distinguishes which one of a number of data vector lengths is to be performed on (e.g., 128, 256, or 512 byte).

In the case of a memory access 1120 instruction template of class B, part of the beta field 1154 is interpreted as a broadcast field 1157B, whose content distinguishes whether or not the broadcast type data manipulation operation is to be performed, while the rest of the beta field 1154 is interpreted as the vector length field 1159B. The memory access 1120 instruction templates include the scale field 1160, and optionally the displacement field 1162A or the displacement scale field 1162B.

With regard to the generic vector friendly instruction format 1100, a full opcode field 1174 is shown including the format field 1140, the base operation field 1142, and the data element width field 1164. While one embodiment is shown where the full opcode field 1174 includes all of these fields, the full opcode field 1174 includes less than all of these fields in embodiments that do not support all of them. The full opcode field 1174 provides the operation code (opcode).

The augmentation operation field 1150, the data element width field 1164, and the write mask field 1170 allow these features to be specified on a per instruction basis in the generic vector friendly instruction format.

The combination of write mask field and data element width field creates typed instructions in that they allow the mask to be applied based on different data element widths.

The various instruction templates found within class A and class B are beneficial in different situations. In some embodiments, different processors or different cores within a processor may support only class A, only class B, or both classes. For instance, a high-performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general-purpose cores, one of the graphics cores intended primarily for graphics and/or scientific computing may support only class A, while one or more of the general-purpose cores may be high-performance general-purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments. Programs written in a high level language would be put (e.g., JIT compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 5A is a block diagram illustrating an exemplary specific vector friendly instruction format according to embodiments. FIG. 5A shows a specific vector friendly instruction format 1200 that is specific in the sense that it specifies the location, size, interpretation, and order of the fields, as well as values for some of those fields. The specific vector friendly instruction format 1200 may be used to extend the x86 instruction set, and thus some of the fields are similar to or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 4 into which the fields from FIG. 5A map are illustrated.

It should be understood that, although embodiments are described with reference to the specific vector friendly instruction format 1200 in the context of the generic vector friendly instruction format 1100 for illustrative purposes, the invention is not limited to the specific vector friendly instruction format 1200 except where claimed. For example, the generic vector friendly instruction format 1100 contemplates a variety of possible sizes for the various fields, while the specific vector friendly instruction format 1200 is shown as having fields of specific sizes. By way of specific example, while the data element width field 1164 is illustrated as a one-bit field in the specific vector friendly instruction format 1200, the invention is not so limited (that is, the generic vector friendly instruction format 1100 contemplates other sizes of the data element width field 1164).

The specific vector friendly instruction format 1200 includes the following fields listed below in the order illustrated in FIG. 5A.

EVEX Prefix 1202 (Bytes 0-3)—is encoded in a four-byte form.

Format Field 1140 (EVEX Byte 0, bits [7:0])—the first byte (EVEX Byte 0) is the format field 1140 and it contains 0x62 (the unique value used for distinguishing the vector friendly instruction format) in one embodiment.

The second-fourth bytes (EVEX Bytes 1-3) include a number of bit fields providing specific capability.

REX field 1205 (EVEX Byte 1, bits [7-5])—consists of an EVEX.R bit field (EVEX Byte 1, bit [7]-R), EVEX.X bit field (EVEX byte 1, bit [6]-X), and EVEX.B bit field EVEX byte 1, bit [5]-B). The EVEX.R, EVEX.X, and EVEX.B bit fields provide the same functionality as the corresponding VEX bit fields, and are encoded using 1s complement form, i.e., ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 1210—this is the first part of the REX' field 1210 and is the EVEX.R' bit field (EVEX Byte 1, bit [4]-R') that is used to encode either the upper 16 or lower 16 of the extended 32 register set. In one embodiment, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 1215 (EVEX byte 1, bits [3:0]-mmmm)—its content encodes an implied leading opcode byte (0F, 0F 38, or 0F 3).

Data element width field 1164 (EVEX byte 2, bit [7]-W)—is represented by the notation EVEX.W. EVEX.W is used to define the granularity (size) of the datatype (either 32-bit data elements or 64-bit data elements).

EVEX.vvvv 1220 (EVEX Byte 2, bits [6:3]-vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in is complement form for certain vector shifts; or 3) EVEX.vvvv does not encode any operand, the field is reserved and should contain 1111b. Thus, EVEX.vvvv field 1220 encodes the 4 low-order bits of the first source register specifier stored in inverted (1s complement) form. Depending on the instruction, an extra different EVEX bit field is used to extend the specifier size to 32 registers.

EVEX.U 1168 Class field (EVEX byte 2, bit [2]-U)—If EVEX.0=0, it indicates class A or EVEX.U0; if EVEX.0=1, it indicates class B or EVEX.U1.

Prefix encoding field 1225 (EVEX byte 2, bits [1:0]-pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's programmable logic array (PLA), so the PLA may execute both the legacy and EVEX format of these legacy instructions without modification. Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2-bit SIMD prefix encodings, and thus not require the expansion.

Alpha field 1152 (EVEX byte 3, bit [7]-EH; also known as EVEX.EH, EVEX.rs, EVEX.RL, EVEX.write mask control, and EVEX.N; also illustrated with a)—as previously described, this field is context specific.

Beta field 1154 (EVEX byte 3, bits [6:4]-SSS, also known as EVEX.$s_{2-0}$, EVEX.$r_{2-0}$, EVEX.rr1, EVEX.LL0, EVEX.LLB; also illustrated with βββ)—as previously described, this field is context specific.

REX' field 1210—this is the remainder of the REX' field and is the EVEX.V' bit field (EVEX Byte 3, bit [3]-V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 1170 (EVEX byte 3, bits [2:0]-kkk)—its content specifies the index of a register in the write mask registers as previously described. In one embodiment, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 1230 (Byte 4) is also known as the opcode byte. Part of the opcode is specified in this field.

MOD R/M Field 1240 (Byte 5) includes MOD field 1242, Reg field 1244, and R/M field 1246. As previously described, the MOD field's 1242 content distinguishes between memory access and non-memory access operations. The role of Reg field 1244 may be summarized to two situations: encoding either the destination register operand or a source register operand or be treated as an opcode extension and not used to encode any instruction operand. The role of R/M field 1246 may include the following: encoding the instruction operand that references a memory address or encoding either the destination register operand or a source register operand.

Scale, Index, Base (SIB) Byte (Byte 6)—As previously described, the content of SIB 1250 is used for memory address generation. SIB.xxx 1254 and SIB.bbb 1256—the contents of these fields have been previously referred to with regard to the register indexes Xxxx and Bbbb.

Displacement field 1162A (Bytes 7-10)—when MOD field 1242 contains 10, bytes 7-10 are the displacement field 1162A, and it works the same as the legacy 32-bit displacement (disp32) and works at byte granularity.

Displacement factor field 1162B (Byte 7)—when MOD field 2642 contains 01, byte 7 is the displacement factor field 1162B. The location of this field is the same as that of the legacy x86 instruction set 8-bit displacement (disp8), which works at byte granularity. Since disp8 is sign extended, it may only address between −128 and 127 bytes offsets; in terms of 64-byte cache lines, disp8 uses 8 bits that may be set to only four really useful values −128, −64, 0, and 64; since a greater range is often needed, disp32 is used; however, disp32 requires 4 bytes. In contrast to disp8 and disp32, the displacement factor field 1162B is a reinterpretation of disp8; when using displacement factor field 1162B, the actual displacement is determined by the content of the displacement factor field multiplied by the size of the memory operand access (N). This type of displacement is referred to as disp8*N. This reduces the average instruction length (a single byte used for the displacement but with a much greater range). Such compressed displacement assumes that the effective displacement is multiple of the granularity of the memory access, and hence, the redundant low-order bits of the address offset do not need to be encoded. In other words, the displacement factor field 1162B substitutes the legacy x86 instruction set 8-bit displacement. Thus, the displacement factor field 1162B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 1172 operates as previously described.

Full Opcode Field

FIG. 5B is a block diagram illustrating the fields of the specific vector friendly instruction format 1200 that make up the full opcode field 1174 according to one embodiment. Specifically, the full opcode field 1174 includes the format field 1140, the base operation field 1142, and the data element width (W) field 1164. The base operation field 1142 includes the prefix encoding field 1225, the opcode map field 1215, and the real opcode field 1230.

Register Index Field

FIG. 5C is a block diagram illustrating the fields of the specific vector friendly instruction format 1200 that make up the register index field 1144 according to one embodiment. Specifically, the register index field 1144 includes the REX 1205 field, the REX' 1210 field, the MODR/M.reg field 1244, the MODR/M.r/m field 1246, the VVVV field 1220, xxx field 1254, and the bbb field 1256.

Augmentation Operation Field

Figure 5D:
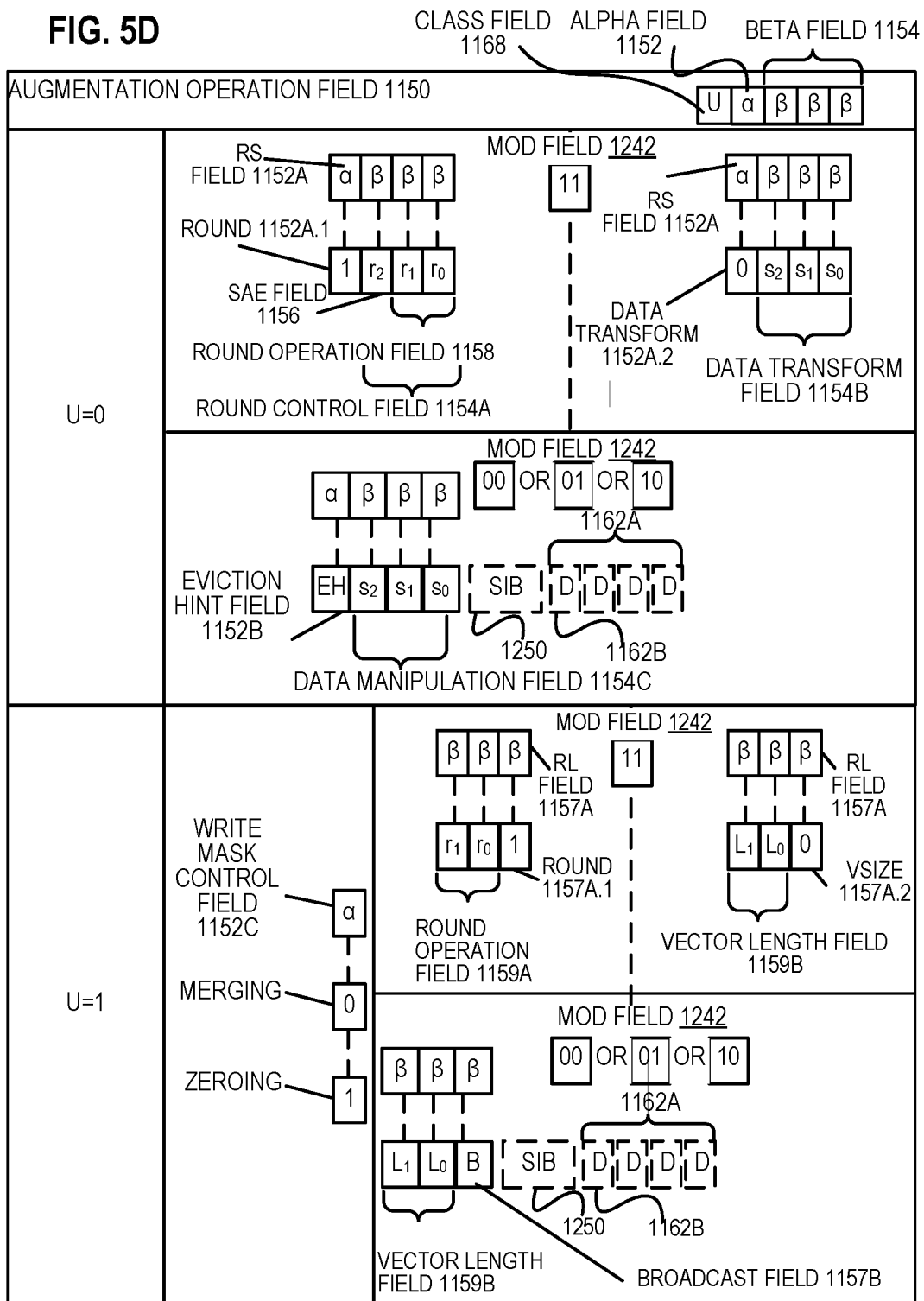
FIG. 5D is a block diagram illustrating the fields of the specific vector friendly instruction format that make up the augmentation operation field according to embodiments.

FIG. 5D is a block diagram illustrating the fields of the specific vector friendly instruction format 1200 that make up the augmentation operation field 1150 according to one embodiment. When the class (U) field 1168 contains 0, it signifies EVEX.U0 (class A 1168A); when it contains 1, it signifies EVEX.U1 (class B 1168B). When U=0 and the MOD field 1242 contains 11 (signifying a no memory access operation), the alpha field 1152 (EVEX byte 3, bit [7]-EH) is interpreted as the rs field 1152A. When the rs field 1152A contains a 1 (round 1152A.1), the beta field 1154 (EVEX byte 3, bits [6:4]-SSS) is interpreted as the round control field 1154A. The round control field 1154A includes a one-bit SAE field 1156 and a two-bit round operation field 1158. When the rs field 1152A contains a 0 (data transform 1152A.2), the beta field 1154 (EVEX byte 3, bits [6:4]-SSS) is interpreted as a three-bit data transform field 1154B. When U=0 and the MOD field 1242 contains 00, 01, or 10 (signifying a memory access operation), the alpha field 1152 (EVEX byte 3, bit [7]-EH) is interpreted as the eviction hint (EH) field 1152B and the beta field 1154 (EVEX byte 3, bits [6:4]-SSS) is interpreted as a three-bit data manipulation field 1154C.

When U=1, the alpha field 1152 (EVEX byte 3, bit [7]-EH) is interpreted as the write mask control (Z) field 1152C. When U=1 and the MOD field 1242 contains 11 (signifying a no memory access operation), part of the beta field 1154 (EVEX byte 3, bit [4]-$S_0$) is interpreted as the RL field 1157A; when it contains a 1 (round 1157A.1) the rest of the beta field 1154 (EVEX byte 3, bit [6-5]-$S_{2-1}$) is interpreted as the round operation field 1159A, while when the RL field 1157A contains a 0 (VSIZE 1157A.2) the rest of the beta field 1154 (EVEX byte 3, bit [6-5]-$S_{2-1}$) is interpreted as the vector length field 1159B (EVEX byte 3, bit [6-5]-$L_{1-0}$). When U=1 and the MOD field 1242 contains 00, 01, or 10 (signifying a memory access operation), the beta field 1154 (EVEX byte 3, bits [6:4]-SSS) is interpreted as the vector length field 1159B (EVEX byte 3, bit [6-5]-$L_{1-0}$) and the broadcast field 1157B (EVEX byte 3, bit [4]-B).

Exemplary Register Architecture

Figure 6:
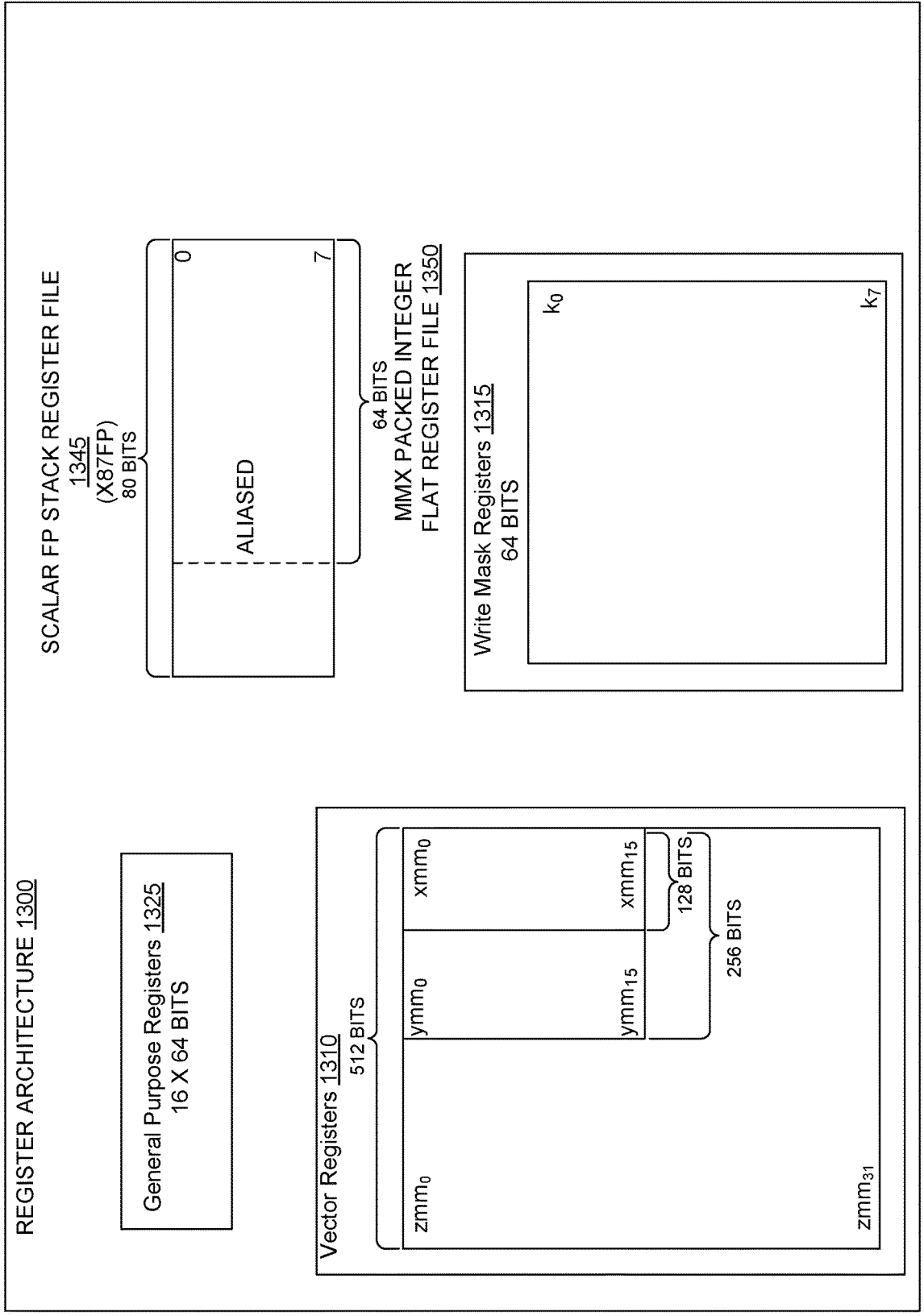
FIG. 6 is a block diagram of a register architecture according to embodiments.

FIG. 6 is a block diagram of a register architecture 1300 according to one embodiment. In the embodiment illustrated, there are 32 vector registers 1310 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-

15. The specific vector friendly instruction format 1200 operates on these overlaid register file as illustrated in the below tables.

| Adjustable Vector Length | Class | Operations | Registers |
|---|---|---|---|
| Instruction Templates that do not include the vector length field 1159B | A (FIG. 5A; U = 0) | 1110, 1115, 1125, 1130 | zmm registers (the vector length is 64 byte) |
| | B (FIG. 5B; U = 1) | 1112 | zmm registers (the vector length is 64 byte) |
| Instruction templates that do include the vector length field 1159B | B FIG. 5B; U = 1) | 1117, 1127 | zmm, ymm, or xmm registers (the vector length is 64-byte, 32 byte, or 16 byte) depending on the vector length field 1159B |

In other words, the vector length field 1159B selects between a maximum length and one or more other shorter lengths, where each such shorter length is half the length of the preceding length; and instruction templates without the vector length field 1159B operate on the maximum vector length. Further, in one embodiment, the class B instruction templates of the specific vector friendly instruction format 1200 operate on packed or scalar single/double-precision floating point data and packed or scalar integer data. Scalar operations are operations performed on the lowest order data element position in a zmm/ymm/xmm register; the higher order data element positions are either left the same as they were prior to the instruction or zeroed depending on the embodiment.

Write mask registers 1315—in the embodiment illustrated, there are 8 write mask registers (k0 through k7), each 64 bits in size. In an alternate embodiment, the write mask registers 1315 are 16 bits in size. As previously described, in one embodiment, the vector mask register k0 may not be used as a write mask; when the encoding that would normally indicate k0 is used for a write mask, it selects a hardwired write mask of 0xFFFF, effectively disabling write masking for that instruction.

General-purpose registers 1325—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1345, on which is aliased the MMX packed integer flat register file 1350—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments may use wider or narrower registers. Additionally, alternative embodiments may use more, less, or different register files and registers.
Exemplary Core Architectures, Processors, and Computer Architectures Processor cores may be implemented in different ways, for different purposes, and in different processors. For instance, implementations of such cores may include: 1) a general purpose in-order core intended for general-purpose computing; 2) a high-performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.
Exemplary Core Architectures
In-Order and Out-of-Order Core Block Diagram FIG. 7A is a block diagram illustrating both an exemplary in-order pipeline and an exemplary register renaming, out-of-order issue/execution pipeline according to embodiments. FIG. 7B is a block diagram illustrating both an exemplary embodiment of an in-order architecture core and an exemplary register renaming, out-of-order issue/execution architecture core to be included in a processor according to embodiments. The solid lined boxes in FIGS. 7A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 7A, a processor pipeline 1400 includes a fetch stage 1402, a length decode stage 1404, a decode stage 1406, an allocation stage 1408, a renaming stage 1410, a scheduling (also known as a dispatch or issue) stage 1412, a register read/memory read stage 1414, an execute stage 1416, a write back/memory write stage 1418, an exception handling stage 1422, and a commit stage 1424.

FIG. 7B shows processor core 1490 including a front-end unit 1430 coupled to an execution engine unit 1450, and both are coupled to a memory unit 1470. The core 1490 may be a reduced instruction set computing (RISC) core, a complex instruction set computing (CISC) core, a very long instruction word (VLIW) core, or a hybrid or alternative core type. As yet another option, the core 1490 may be a special-purpose core, such as, for example, a network or communication core, compression engine, coprocessor core, general purpose computing graphics processing unit (GPGPU) core, graphics core, or the like.

The front-end unit 1430 includes a branch prediction unit 1432 coupled to an instruction cache unit 1434, which is coupled to an instruction translation lookaside buffer (TLB) unit 1436, which is coupled to an instruction fetch unit 1438, which is coupled to a decode unit 1440. The decode unit 1440 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1440 may be implemented using various different mechanisms. Examples of suitable mechanisms include, but are not limited to, look-up tables, hardware implementations, PLAs, microcode read only memories (ROMs), etc. In one embodiment, the core 1490 includes a microcode ROM or other medium that stores microcode for certain macroinstructions (e.g., in decode unit 1440 or otherwise within the front-end unit 1430). The decode unit 1440 is coupled to a rename/allocator unit 1452 in the execution engine unit 1450.

The execution engine unit 1450 includes the rename/allocator unit 1452 coupled to a retirement unit 1454 and a set of one or more scheduler unit(s) 1456. The scheduler unit(s) 1456 represents any number of different schedulers, including reservations stations, central instruction window, etc. The scheduler unit(s) 1456 is coupled to the physical register file(s) unit(s) 1458. Each of the physical register file(s) units 1458 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1458 comprises a vector registers unit, a write mask registers unit, and a scalar registers unit. These register units may provide architectural vector registers, vector mask registers, and general-purpose registers. The physical register file(s) unit(s) 1458 is overlapped by the retirement unit 1454 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1454 and the physical register file(s) unit(s) 1458 are coupled to the execution cluster(s) 1460. The execution cluster(s) 1460 includes a set of one or more execution units 1462 and a set of one or more memory access units 1464. The execution units 1462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1456, physical register file(s) unit(s) 1458, and execution cluster(s) 1460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1464). It should also be understood that where separate pipelines are used, one or more of these pipelines may be out-of-order issue/execution and the rest in-order.

The set of memory access units 1464 is coupled to the memory unit 1470, which includes a data TLB unit 1472 coupled to a data cache unit 1474 coupled to a level 2 (L2) cache unit 1476. In one exemplary embodiment, the memory access units 1464 may include a load unit, a store address unit, and a store data unit, each of which is coupled to the data TLB unit 1472 in the memory unit 1470. The instruction cache unit 1434 is further coupled to a level 2 (L2) cache unit 1476 in the memory unit 1470. The L2 cache unit 1476 is coupled to one or more other levels of cache and eventually to a main memory.

By way of example, the exemplary register renaming, out-of-order issue/execution core architecture may implement the pipeline 1400 as follows: 1) the instruction fetch 1438 performs the fetch and length decoding stages 1402 and 1404; 2) the decode unit 1440 performs the decode stage 1406; 3) the rename/allocator unit 1452 performs the allocation stage 1408 and renaming stage 1410; 4) the scheduler unit(s) 1456 performs the schedule stage 1412; 5) the physical register file(s) unit(s) 1458 and the memory unit 1470 perform the register read/memory read stage 1414; the execution cluster 1460 perform the execute stage 1416; 6) the memory unit 1470 and the physical register file(s) unit(s) 1458 perform the write back/memory write stage 1418; 7) various units may be involved in the exception handling stage 1422; and 8) the retirement unit 1454 and the physical register file(s) unit(s) 1458 perform the commit stage 1424.

The core 1490 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 1490 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1434/1474 and a shared L2 cache unit 1476, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

FIGS. 8A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 8A is a block diagram of a single processor core, along with its connection to the on-die interconnect network 1502 and with its local subset of the Level 2 (L2) cache 1504, according to embodiments. In one embodiment, an instruction decoder 1500 supports the x86 instruction set with a packed data instruction set extension. An L1 cache 1506 allows low-latency accesses to cache memory into the scalar and vector units. While in one embodiment (to simplify the design), a scalar unit 1508 and a vector unit 1510 use separate register sets (respectively, scalar registers 1512 and vector registers 1514) and data transferred between them is written to memory and then read back in from a level 1 (L1) cache 1506, alternative embodiments may use a different approach (e.g., use a single register set or include a communication path that allow data to be transferred between the two register files without being written and read back).

The local subset of the L2 cache 1504 is part of a global L2 cache that is divided into separate local subsets, one per processor core. Each processor core has a direct access path to its own local subset of the L2 cache 1504. Data read by a processor core is stored in its L2 cache subset 1504 and may be accessed quickly, in parallel with other processor cores accessing their own local L2 cache subsets. Data written by a processor core is stored in its own L2 cache subset 1504 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 8B is an expanded view of part of the processor core in FIG. 8A according to embodiments. FIG. 8B includes an L1 data cache 1506A as part of the L1 cache 1506, as well as more detail regarding the vector unit 1510 and the vector registers 1514. Specifically, the vector unit 1510 is a 16-wide vector processing unit (VPU) (see the 16-wide ALU 1528), which executes one or more of integer, single-precision float, and double-precision float instructions. The VPU supports swizzling the register inputs with swizzle unit 1520, numeric conversion with numeric convert units 1522A-B, and replication with replication unit 1524 on the memory input. Write mask registers 1526 allow predicating resulting vector writes.

Figure 9:
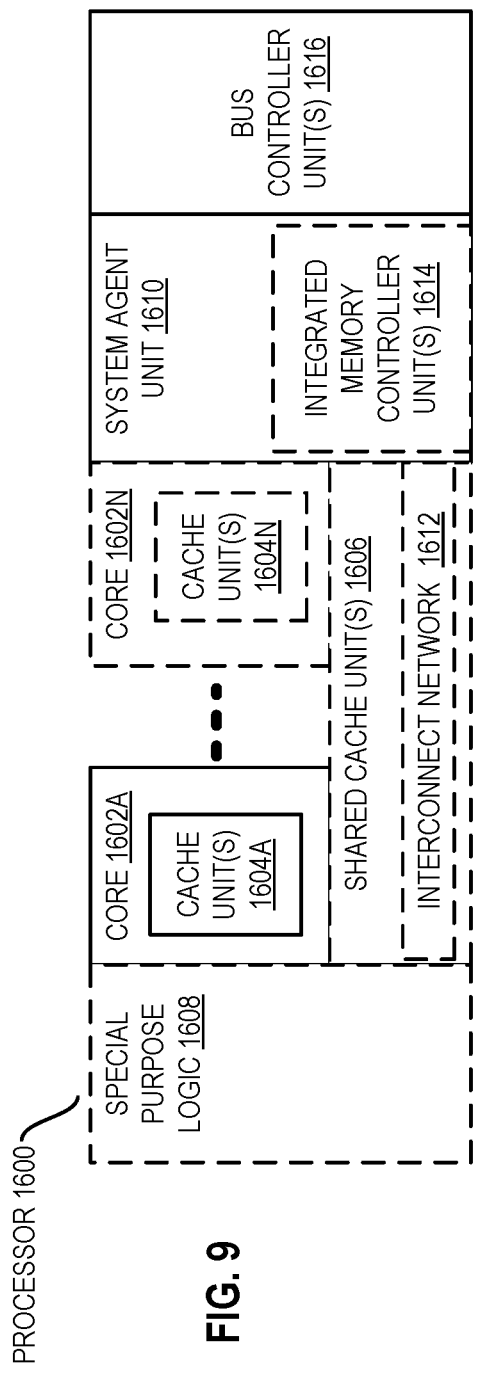
FIG. 9 is a block diagram of a processor that may have more than one core, may have an integrated memory controller, and may have integrated graphics according to embodiments.

FIG. 9 is a block diagram of a processor 1600 that may have more than one core, may have an integrated memory controller, and may have integrated graphics according to embodiments. The solid lined boxes in FIG. 9 illustrate a processor 1600 with a single core 1602A, a system agent unit 1610, a set of one or more bus controller units 1616, while the optional addition of the dashed lined boxes illustrates an alternative processor 1600 with multiple cores 1602A-N, a set of one or more integrated memory controller unit(s) 1614 in the system agent unit 1610, and special purpose logic 1608.

Thus, different implementations of the processor 1600 may include: 1) a CPU with the special purpose logic 1608 being integrated graphics and/or scientific (throughput) logic (which may include one or more cores), and the cores 1602A-N being one or more general purpose cores (e.g., general purpose in-order cores, general purpose out-of-order cores, a combination of the two); 2) a coprocessor with the cores 1602A-N being a large number of special purpose cores intended primarily for graphics and/or scientific (throughput); and 3) a coprocessor with the cores 1602A-N being a large number of general purpose in-order cores. Thus, the processor 1600 may be a general-purpose processor, coprocessor, or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1600 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1606, and external memory (not shown) coupled to the set of integrated memory controller units 1614. The set of shared cache units 1606 may include one or more mid-level caches, such as level 2 (L2), level 3 (L3), level 4 (L4), or other levels of cache, a last level cache (LLC), and/or combinations thereof. While in one embodiment a ring-based interconnect unit 1612 interconnects the special purpose logic 1608 (integrated graphics logic is an example of and is also referred to herein as special purpose logic), the set of shared cache units 1606, and the system agent unit 1610/integrated memory controller unit(s) 1614, alternative embodiments may use any number of well-known techniques for interconnecting such units. In one embodiment, coherency is maintained between one or more cache units 1606 and cores 1602A-N.

In some embodiments, one or more of the cores 1602A-N are capable of multithreading. The system agent 1610 includes those components coordinating and operating cores 1602A-N. The system agent unit 1610 may include for example a power control unit (PCU) and a display unit. The PCU may be or include logic and components needed for regulating the power state of the cores 1602A-N and the special purpose logic 1608. The display unit is for driving one or more externally connected displays.

The cores 1602A-N may be homogenous or heterogeneous in terms of architecture instruction set; that is, two or more of the cores 1602A-N may be capable of execution the same instruction set, while others may be capable of executing only a subset of that instruction set or a different instruction set.

Exemplary Computer Architectures

FIGS. 10-13 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, handheld devices, and various other electronic devices, are also suitable. In general, a huge variety of systems or electronic devices capable of incorporating a processor and/or other execution logic as disclosed herein are generally suitable.

Figure 10:
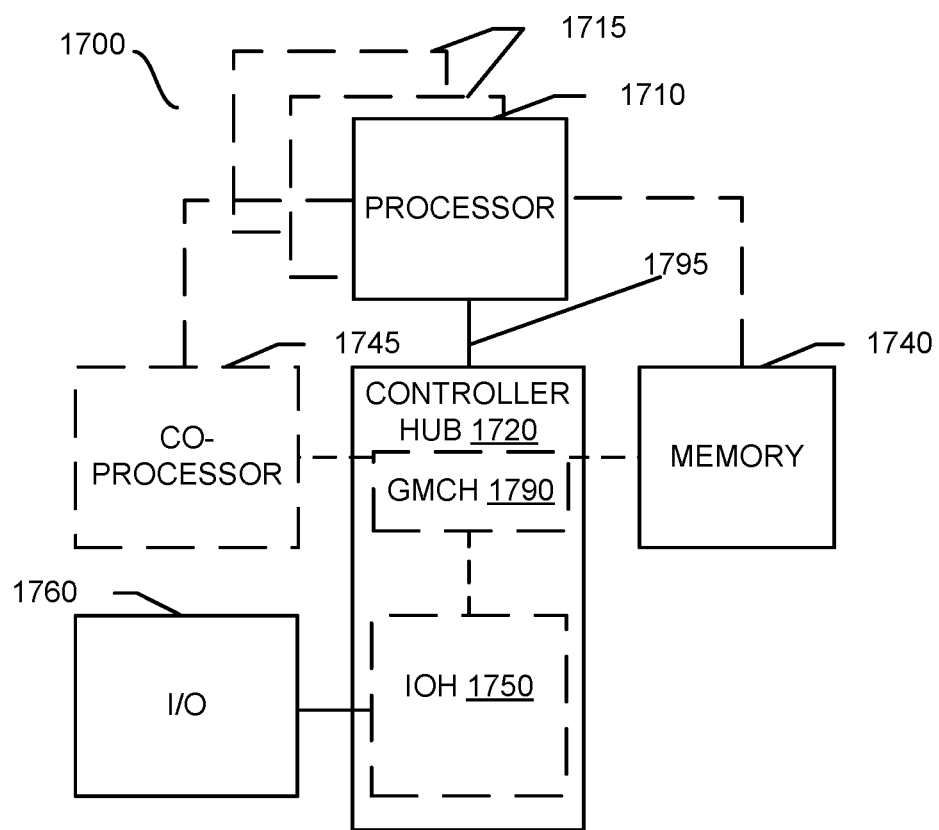
FIG. 10 shows a block diagram of a system according to embodiments.

Referring now to FIG. 10, shown is a block diagram of a system 1700 in accordance with one embodiment. The system 1700 may include one or more processors 1710, 1715, which are coupled to a controller hub 1720. In one embodiment the controller hub 1720 includes a graphics memory controller hub (GMCH) 1790 and an Input/Output Hub (IOH) 1750 (which may be on separate chips); the GMCH 1790 includes memory and graphics controllers to which are coupled memory 1740 and a coprocessor 1745; the IOH 1750 couples input/output (I/O) devices 1760 to the GMCH 1790. Alternatively, one or both of the memory and graphics controllers are integrated within the processor (as described herein), the memory 1740 and the coprocessor 1745 are coupled directly to the processor 1710, and the controller hub 1720 in a single chip with the IOH 1750.

The optional nature of additional processors 1715 is denoted in FIG. 10 with broken lines. Each processor 1710, 1715 may include one or more of the processing cores described herein and may be some version of the processor 1600.

The memory 1740 may be, for example, dynamic random-access memory (DRAM), phase change memory (PCM), or a combination of the two. For at least one embodiment, the controller hub 1720 communicates with the processor(s) 1710, 1715 via a multi-drop bus, such as a frontside bus (FSB), point-to-point interface such as Quick-Path Interconnect (QPI), or similar connection 1795.

In one embodiment, the coprocessor 1745 is a special-purpose processor, such as, for example, a high-throughput MIC processor, a network or communication processor, compression engine, graphics processor, GPGPU, embedded processor, or the like. In one embodiment, controller hub 1720 may include an integrated graphics accelerator.

There may be a variety of differences between the physical resources 1710, 1715 in terms of a spectrum of metrics of merit including architectural, microarchitectural, thermal, power consumption characteristics, and the like.

In one embodiment, the processor 1710 executes instructions that control data processing operations of a general type. Embedded within the instructions may be coprocessor instructions. The processor 1710 recognizes these coprocessor instructions as being of a type that should be executed by the attached coprocessor 1745. Accordingly, the processor 1710 issues these coprocessor instructions (or control signals representing coprocessor instructions) on a coprocessor bus or other interconnect, to coprocessor 1745. Coprocessor (s) 1745 accept and execute the received coprocessor instructions.

Figure 11:
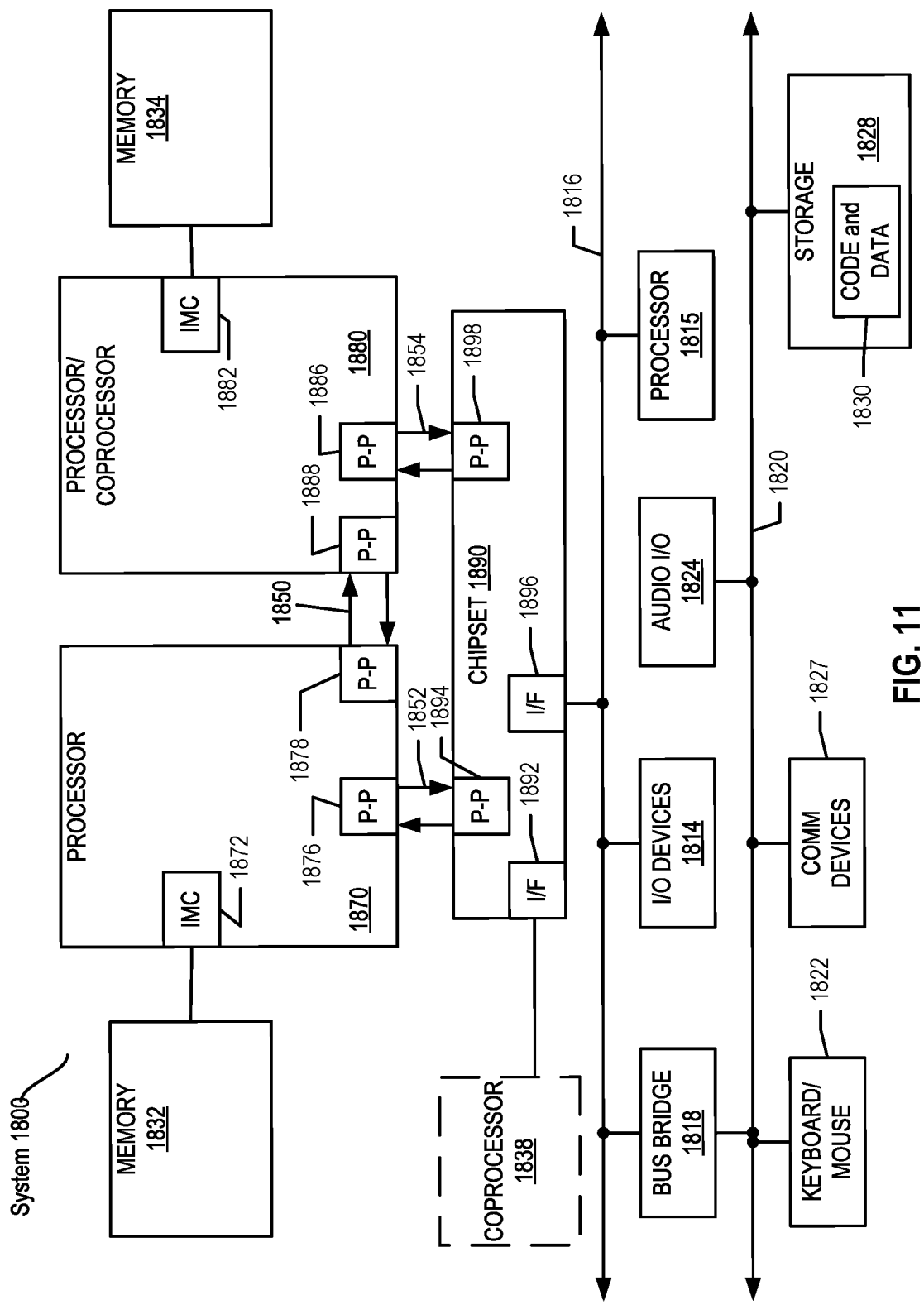
FIG. 11 is a block diagram of a first more specific exemplary system according to embodiments.

Referring now to FIG. 11, shown is a block diagram of a first more specific exemplary system 1800 in accordance with an embodiment. As shown in FIG. 11, multiprocessor system 1800 is a point-to-point interconnect system, and includes a first processor 1870 and a second processor 1880 coupled via a point-to-point interconnect 1850. Each of processors 1870 and 1880 may be some version of the processor 1600. In one embodiment, processors 1870 and 1880 are respectively processors 1710 and 1715, while coprocessor 1838 is coprocessor 1745. In another embodiment, processors 1870 and 1880 are respectively processor 1710 coprocessor 1745.

Processors 1870 and 1880 are shown including integrated memory controller (IMC) units 1872 and 1882, respectively. Processor 1870 also includes as part of its bus controller unit's point-to-point (P-P) interfaces 1876 and 1878; similarly, second processor 1880 includes P-P interfaces 1886 and 1888. Processors 1870, 1880 may exchange information via a point-to-point (P-P) interface 1850 using P-P interface circuits 1878, 1888. As shown in FIG. 11, IMCs 1872 and 1882 couple the processors to respective memories, namely a memory 1832 and a memory 1834, which may be portions of main memory locally attached to the respective processors.

Processors 1870, 1880 may each exchange information with a chipset 1890 via individual P-P interfaces 1852, 1854 using point to point interface circuits 1876, 1894, 1886, 1898. Chipset 1890 may optionally exchange information with the coprocessor 1838 via a high-performance interface 1892. In one embodiment, the coprocessor 1838 is a special-purpose processor, such as, for example, a high-throughput MIC processor, a network or communication processor, compression engine, graphics processor, GPGPU, embedded processor, or the like.

A shared cache (not shown) may be included in either processor or outside of both processors yet connected with the processors via P-P interconnect, such that either or both processors' local cache information may be stored in the shared cache if a processor is placed into a low power mode.

Chipset 1890 may be coupled to a first bus 1816 via an interface 1896. In one embodiment, first bus 1816 may be a Peripheral Component Interconnect (PCI) bus, or a bus such as a PCI Express bus or another third generation I/O interconnect bus, although the scope of the present invention is not so limited.

As shown in FIG. 11, various I/O devices 1814 may be coupled to first bus 1816, along with a bus bridge 1818 which couples first bus 1816 to a second bus 1820. In one embodiment, one or more additional processor(s) 1815, such as coprocessors, high-throughput MIC processors, GPGPU's, accelerators (such as, e.g., graphics accelerators or digital signal processing (DSP) units), field programmable gate arrays, or any other processor, are coupled to first bus 1816. In one embodiment, second bus 1820 may be a low pin count (LPC) bus. Various devices may be coupled to a second bus 1820 including, for example, a keyboard and/or mouse 1822, communication devices 1827 and a storage unit 1828 such as a disk drive or other mass storage device which may include instructions/code and data 1830, in one embodiment. Further, an audio I/O 1824 may be coupled to the second bus 1820. Note that other architectures are possible. For example, instead of the point-to-point architecture of FIG. 11, a system may implement a multi-drop bus or other such architecture.

Figure 12:
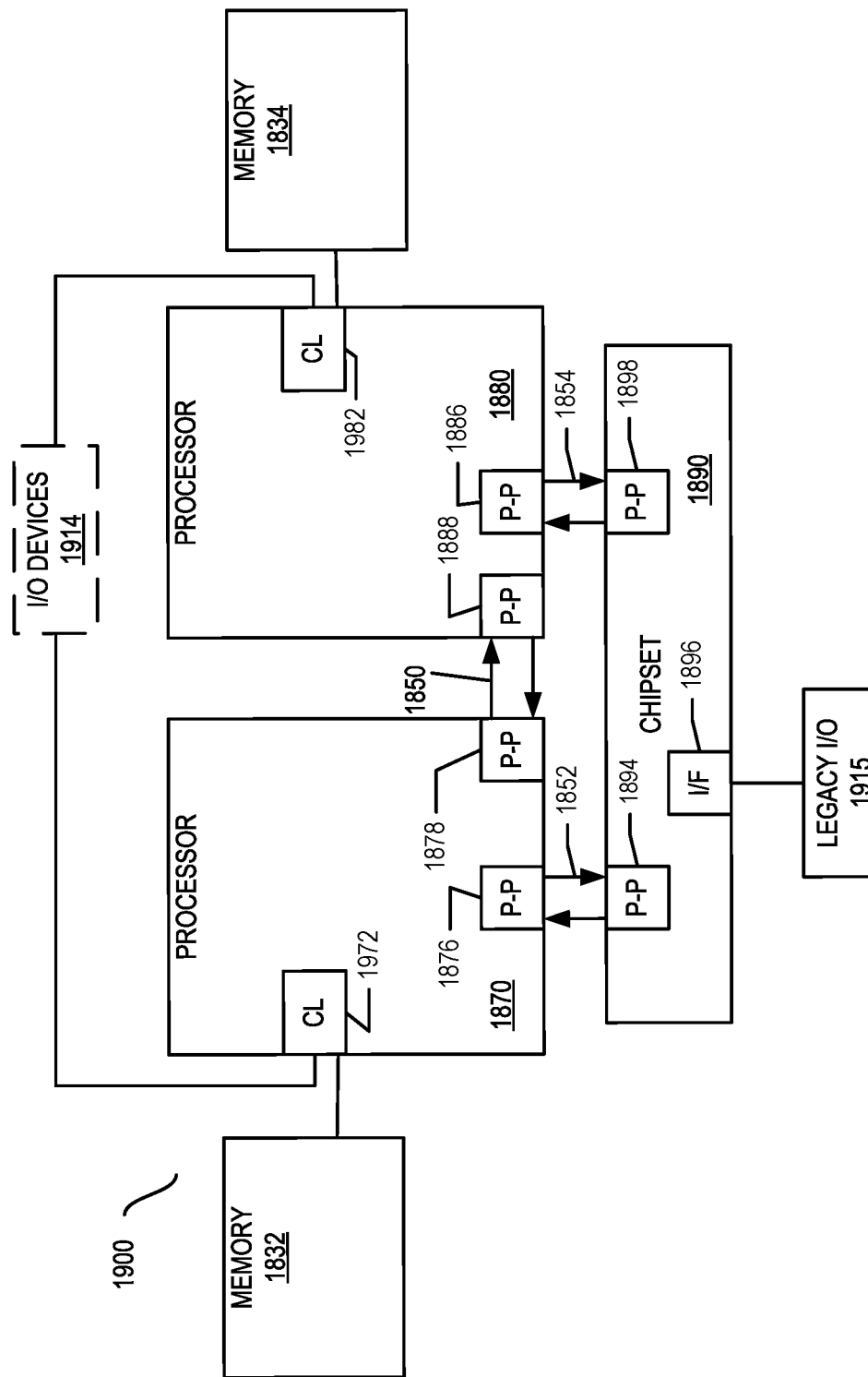
FIG. 12 is a block diagram of a second more specific exemplary system according to embodiments.

Referring now to FIG. 12, shown is a block diagram of a second more specific exemplary system 1900 in accordance with an embodiment. Like elements in FIGS. 11 and 12 bear like reference numerals, and certain aspects of FIG. 11 have been omitted from FIG. 12 in order to avoid obscuring other aspects of FIG. 11.

FIG. 12 illustrates that the processors 1870, 1880 may include integrated memory and I/O control logic ("CL") 1972 and 1982, respectively. Thus, the CL 1972, 1982 include integrated memory controller units and include I/O control logic. FIG. 12 illustrates that not only are the memories 1832, 1834 coupled to the CL 3372, 3382, but also that I/O devices 3314 are also coupled to the control logic 3372, 3382. Legacy I/O devices 3315 are coupled to the chipset 1890.

Figure 13:
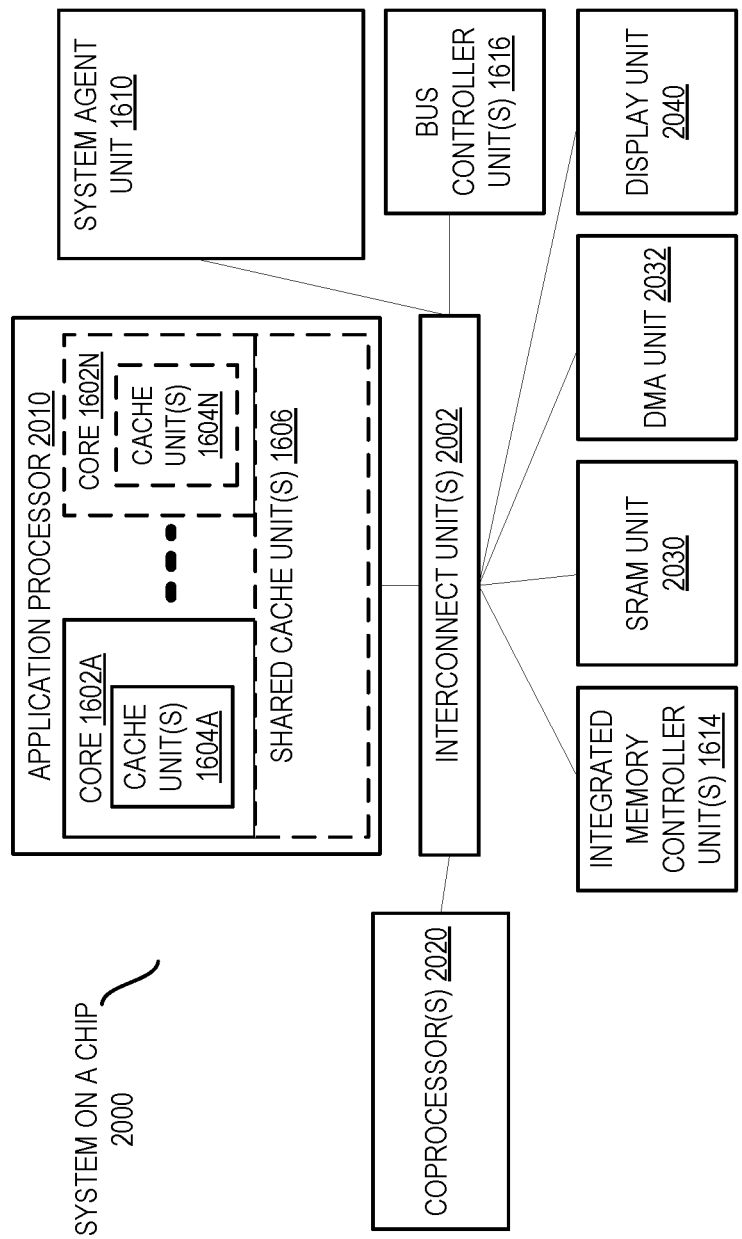
FIG. 13 is a block diagram of a System-on-a-Chip (SoC) according to embodiments.

Referring now to FIG. 13, shown is a block diagram of a SoC 2000 in accordance with an embodiment. Similar elements in FIG. 13 bear like reference numerals. Also, dashed lined boxes are optional features on more advanced SoCs. In FIG. 13, an interconnect unit(s) 2002 is coupled to: an application processor 2010 which includes a set of one or more cores 1602A-N, which include cache units 1604A-N, and shared cache unit(s) 1606; a system agent unit 1610; a bus controller unit(s) 1616; an integrated memory controller unit(s) 1614; a set or one or more coprocessors 2020 which may include integrated graphics logic, an image processor, an audio processor, and a video processor; an static random access memory (SRAM) unit 2030; a direct memory access (DMA) unit 2032; and a display unit 2040 for coupling to one or more external displays. In one embodiment, the coprocessor(s) 2020 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments may be implemented as computer programs or program code executing on programmable systems comprising at least one processor, a storage system (including volatile and non-volatile memory and/or storage elements), at least one input device, and at least one output device.

Program code, such as code 1830 illustrated in FIG. 11, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high-level procedural or object-oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores," may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 14 is a block diagram contrasting the use of a software instruction converter to convert binary instructions in a source instruction set to binary instructions in a target instruction set according to embodiments. In the illustrated embodiment, the instruction converter is a software instruction converter, although alternatively the instruction converter may be implemented in software, firmware, hardware, or various combinations thereof. FIG. 14 shows a program in a high-level language 2102 may be compiled using an x86 compiler 2104 to generate x86 binary code 2106 that may be natively executed by a processor with at least one x86 instruction set core 2116. The processor with at least one x86 instruction set core 2116 represents any processor that may perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 2104 represents a compiler that is operable to generate x86 binary code 2106 (e.g., object code) that may, with or without additional linkage processing, be executed on the processor with at least one x86 instruction set core 2116. Similarly, FIG. 14 shows the program in the high-level language 2102 may be compiled using an alternative instruction set compiler 2108 to generate alternative instruction set binary code 2110 that may be natively executed by a processor without at least one x86 instruction set core 2114 (e.g., a processor with cores that execute the MIPS instruction set of MIPS Technologies of Sunnyvale, CA and/or that execute the ARM instruction set of ARM Holdings of Sunnyvale, CA). The instruction converter 2112 is used to convert the x86 binary code 2106 into code that may be natively executed by the processor without an x86 instruction set core 2114. This converted code is not likely to be the same as the alternative instruction set binary code 2110 because an instruction converter capable of this is difficult to make; however, the converted code will accomplish the general operation and be made up of instructions from the alternative instruction set. Thus, the instruction converter 2112 represents software, firmware, hardware, or a combination thereof that, through emulation, simulation, or any other process, allows a processor or other electronic device that does not have an x86 instruction set processor or core to execute the x86 binary code 2106.

Additional Examples

In embodiments, an apparatus includes resource sharing hardware and multiple cores. The resource sharing hardware is to share the shared resource among the cores. A first core includes first execution circuitry to execute multiple threads. The first core also includes registers programmable by software. A first register is to store a first identifier of a first thread and a first priority tag to indicate a first priority of the first thread relative to a second priority of a second thread. A second register to store a second identifier of the second thread and a second priority tag to indicate the second priority of the second thread relative to the first priority of the first thread. The resource sharing hardware is to use the first priority and the second priority to control access to the shared resource by the first thread and the second thread.

Any such embodiments may include any of the following aspects. The shared resource is inside the first core. The shared resource is a cache. The resource sharing hardware is outside the first core. A second core of the plurality of cores includes second execution circuitry to execute a third thread; and a third register programmable by the software to store a third identifier of the third thread and a third priority tag to indicate a third priority of the third thread relative to the first priority and the second priority; wherein the resource sharing hardware is also to use the first priority and the third priority to control access to the shared resource by the first thread and the third thread. The shared resource is memory bandwidth. The shared resource is power. The resource sharing hardware is to control sharing of the shared resource by switching access to at least a portion of the shared resource between the first thread and the second thread. The resource sharing hardware is to determine to perform the switching based on dynamic demand for the shared resource. At least one determination to perform the switching is to be independent of a reprogramming of any of the plurality of registers. The first register is also to store a first class of service of the first thread; the second register is also to store a second class of service of the second thread; and the resource sharing hardware is also to control sharing of the shared resource by allocating, based on the first class of service, a portion of the shared resource to the first thread or, based on the second class of service, the portion of the shared resource to the second thread. The apparatus includes a third register programmable by the software to indicate a mapping between priority tags to be used by the software and priority levels to be used by the resource sharing hardware.

In embodiments, a method includes storing, in a first register in a core, a first identifier of a first thread to be executed by the core and a first priority tag to indicate a first priority of the first thread relative to a second priority of a second thread to be executed by the cored; storing, in a second register in the core, a second identifier of the second thread and a second priority tag to indicate the second priority of the second thread relative to the first priority of the first thread; and using, by resource sharing hardware, the first priority and the second priority to control access to a shared resource by the first thread and the second thread.

Any such embodiments may include any of the following aspects. The method includes storing, in a third register in a second core, a third identifier of a third thread to be executed by the second core and a third priority tag to indicate a third priority of the third thread relative to the first priority and the second priority; and using, by the resource sharing hardware, the first priority and the third priority to control access to the shared resource by the first thread and the third thread. The method includes storing a first class of service of the first thread in the first register; storing a second class of service of the second thread in the second register; and allocating, based on the first class of service, at least a portion of the shared resource to the first thread. The method includes measuring dynamic demand for the shared resource. The method includes re-allocating, based on measured dynamic demand for the shared resource, the portion of the shared resource from the first thread to the second thread. Re-allocating is independent of a reprogramming of the first register or the second register.

In embodiments, a system includes resource sharing hardware to control a shared resource; and a plurality of cores to share the shared resource, including a first core having a first architecture and a second core having a second architecture, wherein the first core includes first execution circuitry to execute a first thread; a first register programmable by software to store a first identifier of the first thread and a first priority tag to indicate a first priority of the first thread relative to a second priority of the second thread; the second core includes second execution circuitry to execute a second thread; a second register programmable by software to store a second identifier of the second thread and a second priority tag to indicate a second priority of the second thread relative to the first priority of the first thread; and the resource sharing hardware is to use the first priority and the second priority to control access to the shared resource by the first thread and the second thread.

Any such embodiments may include any of the following aspects. The first architecture is different than the second architecture. The shared resource is inside the first core. The shared resource is a cache. The resource sharing hardware is outside the first core. A second core of the plurality of cores includes second execution circuitry to execute a third thread; and a third register programmable by the software to store a third identifier of the third thread and a third priority tag to indicate a third priority of the third thread relative to the first priority and the second priority; wherein the resource sharing hardware is also to use the first priority and the third priority to control access to the shared resource by the first thread and the third thread. The shared resource is memory bandwidth. The shared resource is power. The resource sharing hardware is to control sharing of the shared resource by switching access to at least a portion of the shared resource between the first thread and the second thread. The resource sharing hardware is to determine to perform the switching based on dynamic demand for the shared resource. At least one determination to perform the switching is to be independent of a reprogramming of any of the plurality of registers. The first register is also to store a first class of service of the first thread; the second register is also to store a second class of service of the second thread; and the resource sharing hardware is also to control sharing of the shared resource by allocating, based on the first class of service, a portion of the shared resource to the first thread or, based on the second class of service, the portion of the shared resource to the second thread. The apparatus includes a third register programmable by the software to indicate a mapping between priority tags to be used by the software and priority levels to be used by the resource sharing hardware.

In embodiments, an apparatus may include means for performing any function disclosed herein. In embodiments, an apparatus may comprise a data storage device that stores code that when executed by a hardware processor causes the hardware processor to perform any method disclosed herein. An apparatus may be as described in the detailed description. A method may be as described in the detailed description. In embodiments, a non-transitory machine-readable medium may store code that when executed by a machine causes the machine to perform a method comprising any method disclosed herein.

In embodiments, the apparatus may be a core, a processor, a coprocessor, an accelerator, a core, or processor coupled to a coprocessor or accelerator, a system-on-a-chip, a system, etc. In embodiments, an apparatus may include means for performing any function disclosed herein. In embodiments, an apparatus may include a data storage device that stores code that when executed by a hardware processor causes the hardware processor to perform any method disclosed herein. An apparatus may be as described in the detailed description. A method may be as described in the detailed description. In embodiments, a non-transitory machine-readable medium may store code that when executed by a machine causes the machine to perform a method including any method disclosed herein.

Method embodiments may include any details, features, etc. or combinations of details, features, etc. described in this specification.

While the invention has been described in terms of several embodiments, those skilled in the art will recognize that the invention is not limited to the embodiments described and may be practiced with modification and alteration within the spirit and scope of the appended claims. The description is thus to be regarded as illustrative instead of limiting.

What is claimed is:

1. An apparatus comprising:
   resource sharing hardware to control a shared resource; and
   a plurality of cores to share the shared resource, including a first core, the first core including:
      first execution circuitry to execute a first plurality of threads, the plurality of threads including a first thread and a second thread;
      a first plurality of registers programmable by software, including:
         a first register to store a first identifier of the first thread, a first class of service value to allow the software to directly control access to the shared resource by the first thread, and a first priority tag to indicate a first priority of the first thread relative to a second priority of the second thread, wherein the first priority is higher than the second priority; and
         a second register to store a second identifier of the second thread, a second class of service value to allow the software to directly control access to the shared resource by the second thread, and a second priority tag to indicate the second priority of the second thread relative to the first priority of the first thread;
   wherein the resource sharing hardware is to control access to the shared resource by the first thread and the second thread dynamically, including allocating, based on the first class of service value, at least a portion of the shared resource to the first thread; measuring dynamic demand for the shared resource; and re-allocating, based on the second priority tag and measured dynamic demand for the shared resource, the portion of the shared resource from the first thread to the second thread.

2. The apparatus of claim 1, further comprising the shared resource inside the first core.

3. The apparatus of claim 1, wherein the shared resource is a cache.

4. The apparatus of claim 1, wherein the resource sharing hardware is outside the first core.

5. The apparatus of claim 4, wherein a second core of the plurality of cores includes:
   second execution circuitry to execute a third thread; and
   a third register programmable by the software to store a third identifier of the third thread and a third priority tag to indicate a third priority of the third thread relative to the first priority and the second priority;
   wherein the resource sharing hardware is also to use the first priority and the third priority to control access to the shared resource by the first thread and the third thread.

6. The apparatus of claim 5, wherein the shared resource is memory bandwidth.

7. The apparatus of claim 5, wherein the shared resource is power.

8. The apparatus of claim 1, further comprising a third register programmable by the software to indicate a mapping between priority tags to be used by the software and priority levels to be used by the resource sharing hardware.

9. A method comprising:
   storing, in a first register in a core, a first identifier of a first thread to be executed by the core, a first class of service value to allow software to directly control access to a shared resource by the first thread, and a first priority tag to indicate a first priority of the first thread relative to a second priority of a second thread to be executed by the core, wherein the first priority is higher than the second priority;
   storing, in a second register in the core, a second identifier of the second thread, a second class of service value to allow the software to directly control access to the shared resource by the second thread, and a second priority tag to indicate the second priority of the second thread relative to the first priority of the first thread;
   controlling, by resource sharing hardware, access to the shared resource by the first thread and the second thread dynamically, including allocating, based on the first class of service value, at least a portion of the shared resource to the first thread; measuring dynamic demand for the shared resource; and re-allocating, based on the second priority tag and measured dynamic demand for the shared resource, the portion of the shared resource from the first thread to the second thread.

10. The method of claim 9, further comprising:
    storing, in a third register in a second core, a third identifier of a third thread to be executed by the second core and a third priority tag to indicate a third priority of the third thread relative to the first priority and the second priority; and
    using, by the resource sharing hardware, the first priority and the third priority to control access to the shared resource by the first thread and the third thread.

11. A system comprising:
    resource sharing hardware to control a shared resource; and
    a plurality of cores to share the shared resource, including a first core having a first architecture and a second core having a second architecture, wherein:
    the first core includes:
       first execution circuitry to execute a first thread;
       a first register programmable by software to store a first identifier of the first thread, a first class of service value to allow the software to directly control access to the shared resource by the first thread, and a first priority tag to indicate a first priority of the first thread relative to a second priority of the second thread, wherein the first priority is higher than the second priority;
    the second core includes:
       second execution circuitry to execute a second thread;
       a second register programmable by software to store a second identifier of the second thread, a second class of service value to allow the software to directly control access to the shared resource by the second thread, and a second priority tag to indicate a second priority of the second thread relative to the first priority of the first thread; and
    the resource sharing hardware is to control access to the shared resource by the first thread and the second thread dynamically, including allocating, based on the first class of service value, at least a portion of the shared resource to the first thread; measuring dynamic demand for the shared resource; and re-allocating, based on the second priority tag and measured dynamic demand for the shared resource, the portion of the shared resource from the first thread to the second thread.

12. The system of claim 11, wherein the first architecture is different than the second architecture.

* * * * *